US009071341B2

(12) United States Patent
Neff

(10) Patent No.: US 9,071,341 B2
(45) Date of Patent: Jun. 30, 2015

(54) RANDOM NON-CYCLICAL BINARY CODE GENERATOR

(76) Inventor: Rupert Theodore Neff, Goose Creek, SC (US)

( * ) Notice: Subject to any disclaimer, the term of this patent is extended or adjusted under 35 U.S.C. 154(b) by 149 days.

(21) Appl. No.: 13/595,684

(22) Filed: Aug. 27, 2012

(65) Prior Publication Data

US 2014/0056333 A1 Feb. 27, 2014

(51) Int. Cl.
*H04B 1/7073* (2011.01)
(52) U.S. Cl.
CPC .................................. *H04B 1/7073* (2013.01)
(58) Field of Classification Search
CPC .......................... H04B 1/7073; H04B 1/70735
USPC ......... 375/130, 141, 142, 145, 147, 149, 150, 375/152, 340–343; 370/328, 345
See application file for complete search history.

(56) References Cited

U.S. PATENT DOCUMENTS

| 5,077,753 A * | 12/1991 | Grau et al. ..................... 375/141 |
| 2007/0110229 A1* | 5/2007 | Lablans .......................... 380/28 |
| 2009/0092250 A1* | 4/2009 | Lablans ......................... 380/255 |

* cited by examiner

*Primary Examiner* — Daniel Washburn
*Assistant Examiner* — Eboni Hughes

(57) ABSTRACT

Presented is a random non-cyclical binary code generator for communications systems. A random non-cyclical sequence of integers from a random number generator is extended in length to form an extended integer sequence. This integer set is immediately loaded into a 10-minute epoch memory consistent with 10 minutes of chips. These integers are then synchronously retrieved from memory under GPS time-of-day control. Retrieved integers are immediately converted into pulse pairs of all ones followed by all zeros with each pulse width equal to the integer value in chips. The chips are immediately concatenated to a chipping clock shifting memory wherein each memory location is a unique phase source of the binary code. The memory length in chips is twice the range uncertainty for a 10 MHz chip rate, with the center chip of the shifting memory maintained as the source of universal time synchronized local binary code.

3 Claims, 18 Drawing Sheets

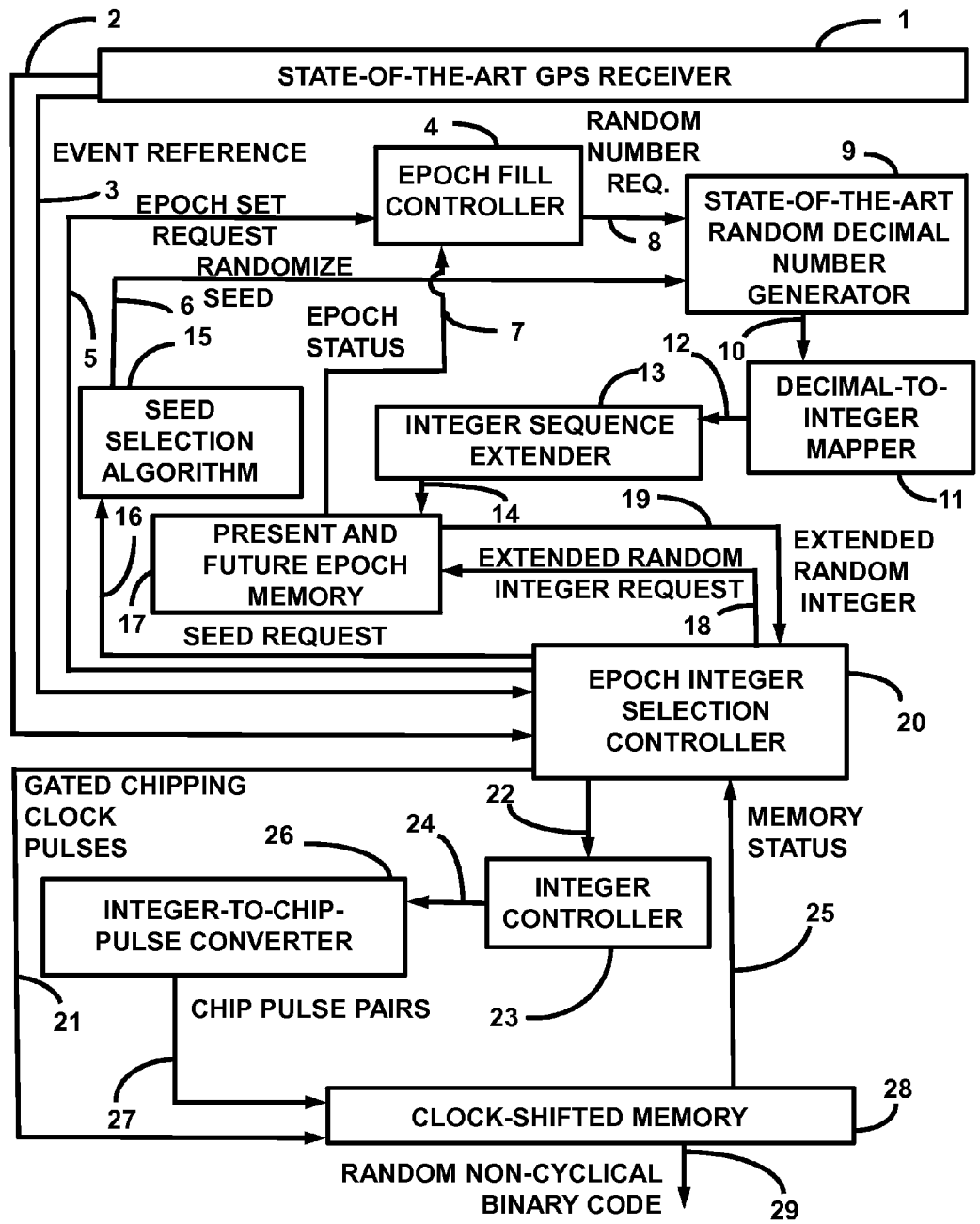
FIG. 1  A RANDOM NON-CYCLICAL BINARY CODE GENERATOR

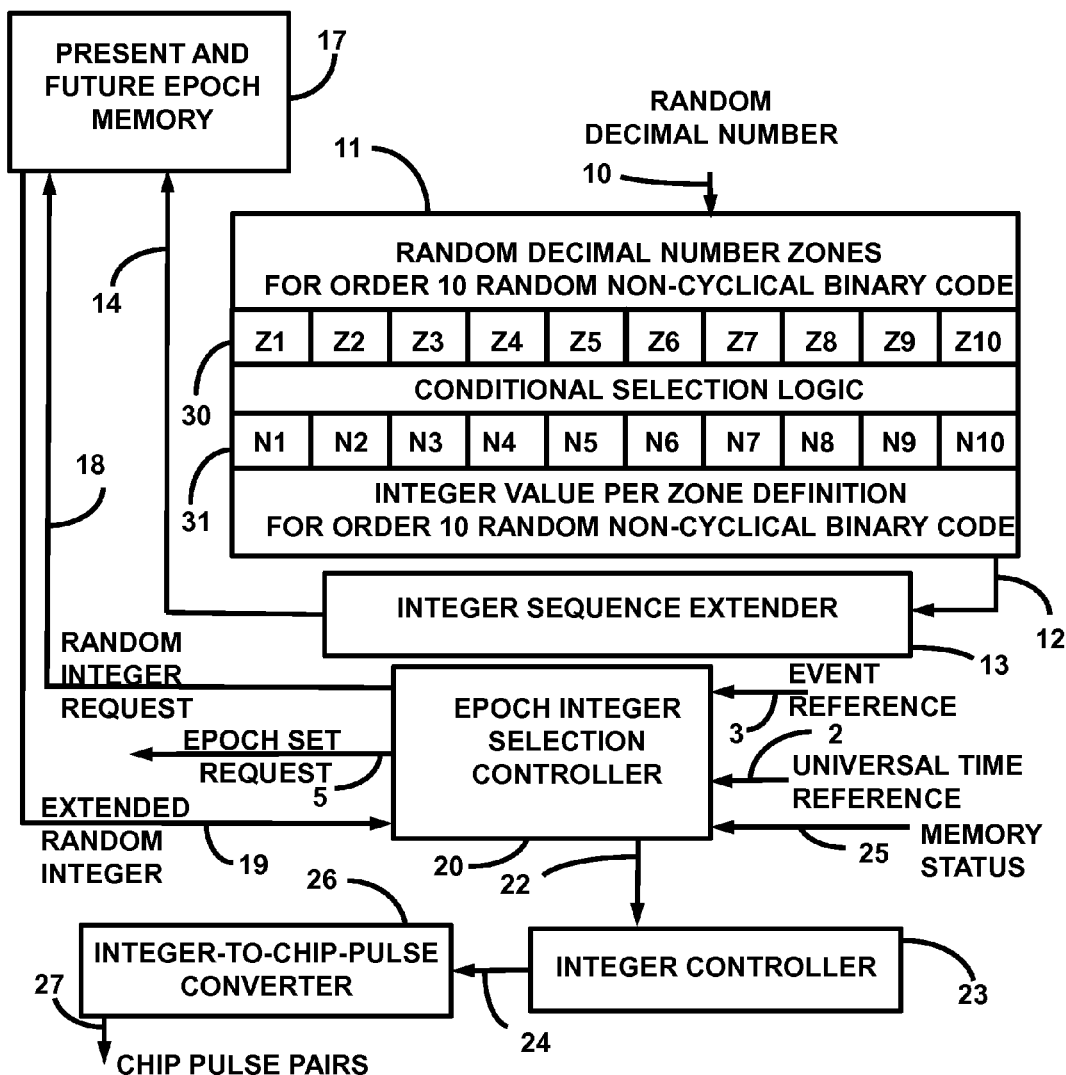
FIG. 2  EPOCH FILL PROCESSES

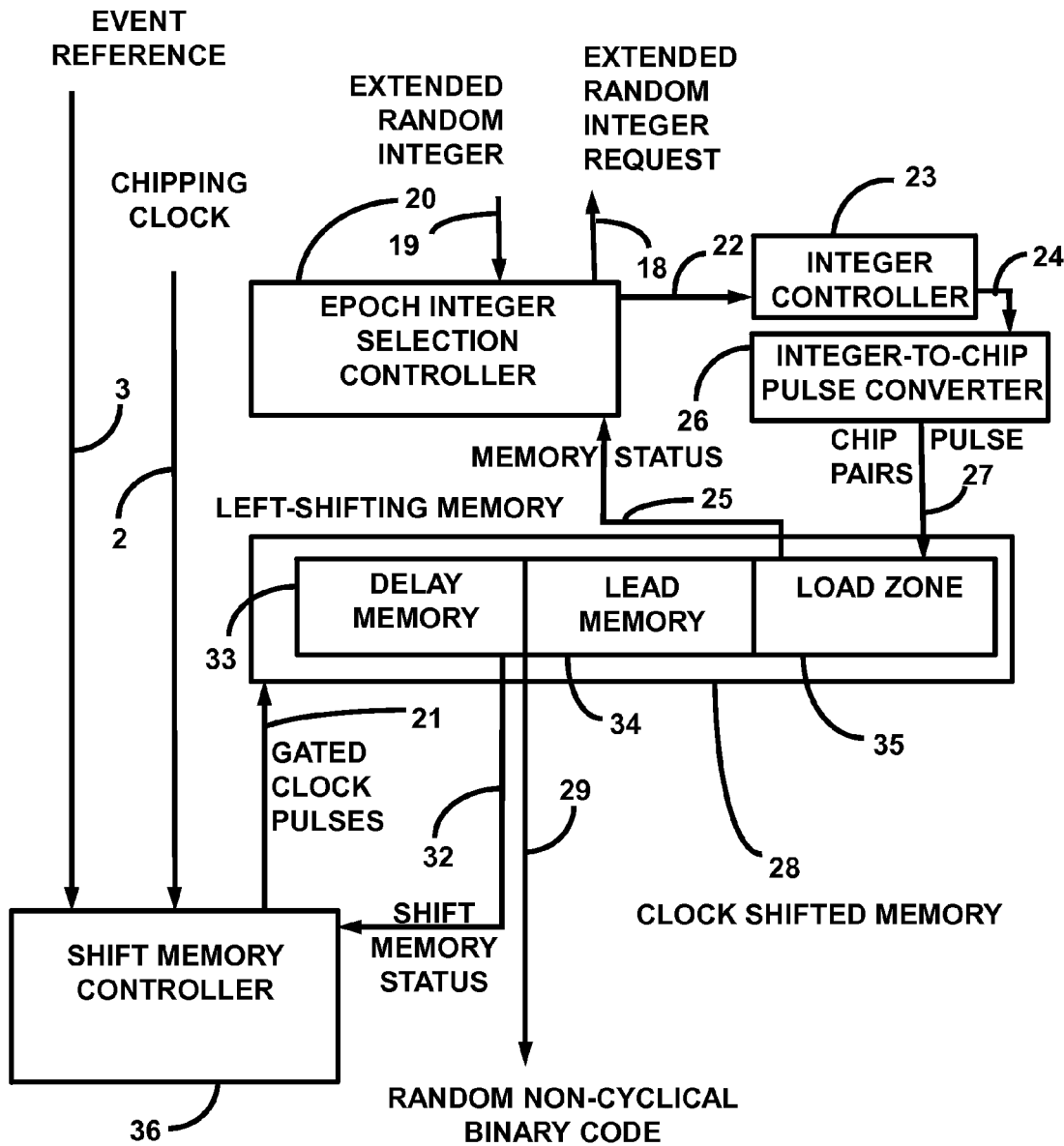
FIG. 3  CHIPPING CLOCK-SHIFTED MEMORY

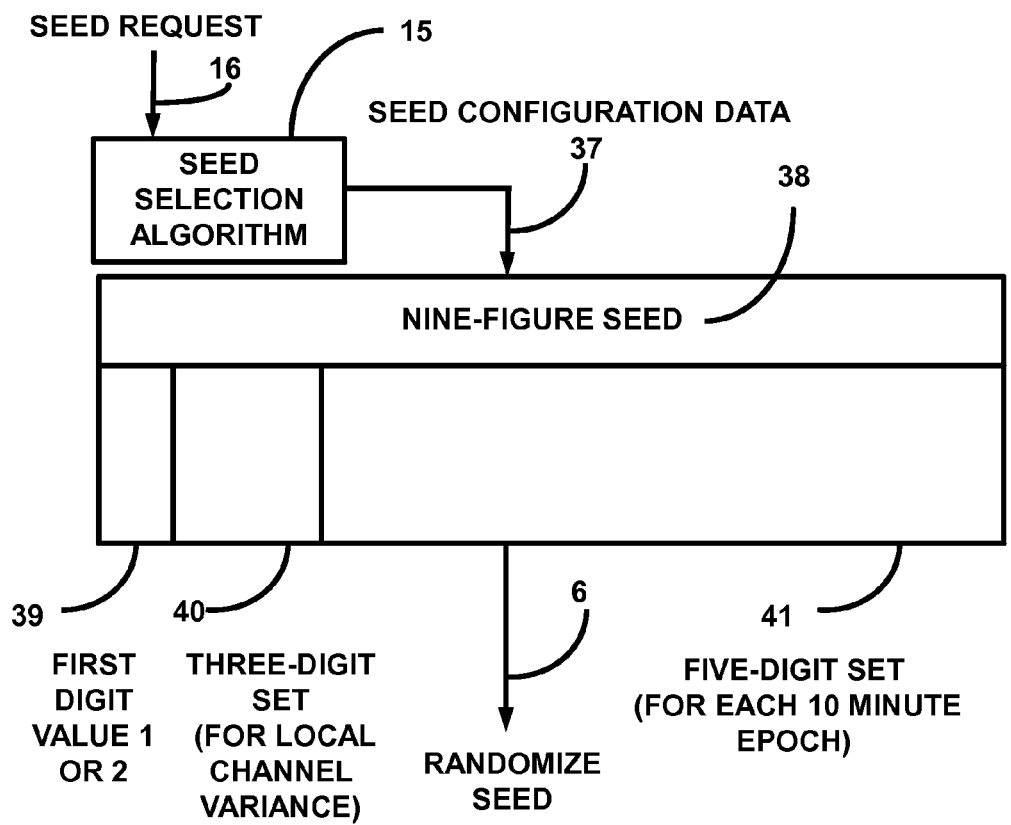
FIG. 4   RANDOMIZE SEED SELECTION

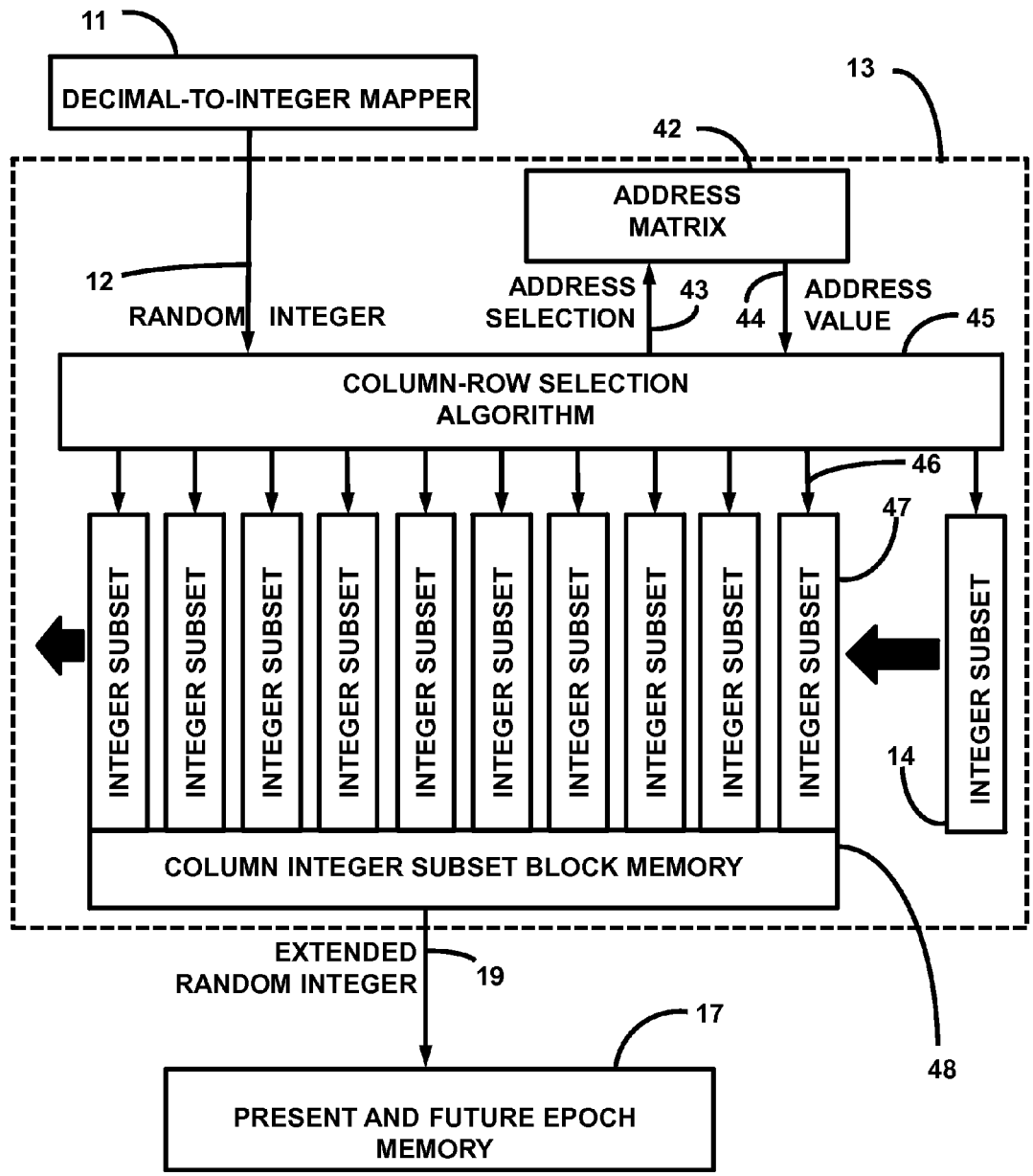
FIG. 5   RANDOM INTEGER SEQUENCE EXTENDER

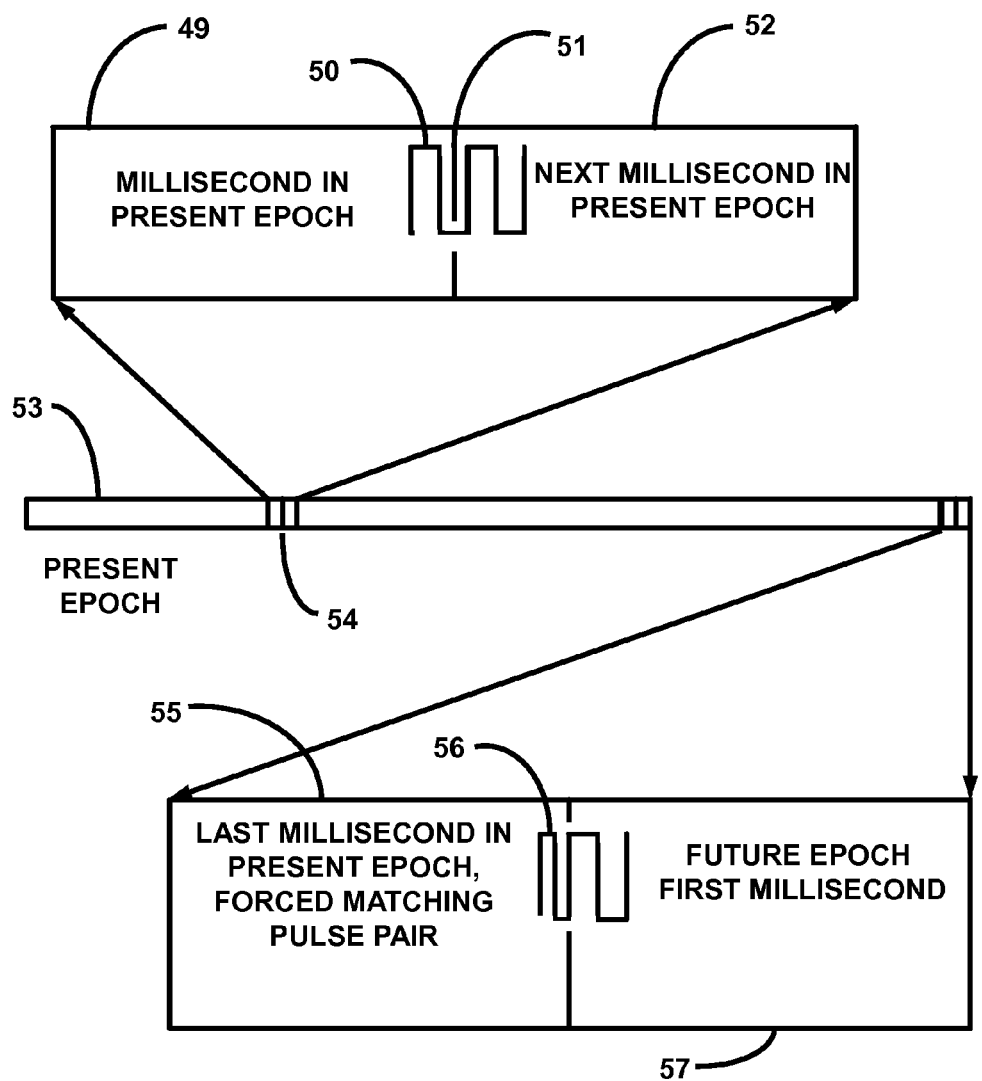
FIG. 6 EPOCH ROLLOVER CONTROL PROCESS

FIG. 7A   EXAMPLE PSEUDORANDOM NOISE EMULATION
CONFIGURATION, 10 MEGAHERTZ CHIPPING RATE
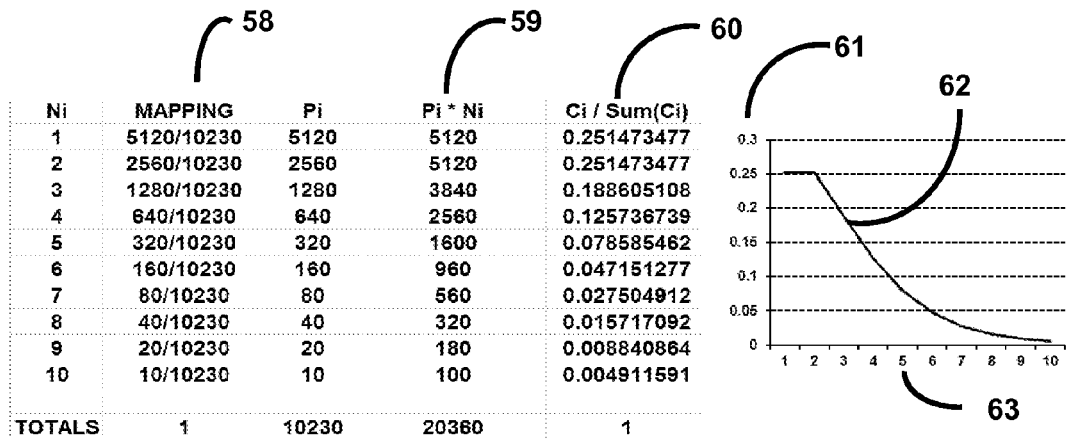
PSEUDORANDOM NOISE INTEGER MAPPER CONFIGURATION
| Ni | MAPPING | Pi | Pi * Ni | Ci / Sum(Ci) |
|---|---|---|---|---|
| 1 | 5120/10230 | 5120 | 5120 | 0.251473477 |
| 2 | 2560/10230 | 2560 | 5120 | 0.251473477 |
| 3 | 1280/10230 | 1280 | 3840 | 0.188605108 |
| 4 | 640/10230 | 640 | 2560 | 0.125736739 |
| 5 | 320/10230 | 320 | 1600 | 0.078585462 |
| 6 | 160/10230 | 160 | 960 | 0.047151277 |
| 7 | 80/10230 | 80 | 560 | 0.027504912 |
| 8 | 40/10230 | 40 | 320 | 0.015717092 |
| 9 | 20/10230 | 20 | 180 | 0.008840864 |
| 10 | 10/10230 | 10 | 100 | 0.004911591 |
| TOTALS | 1 | 10230 | 20360 | 1 |

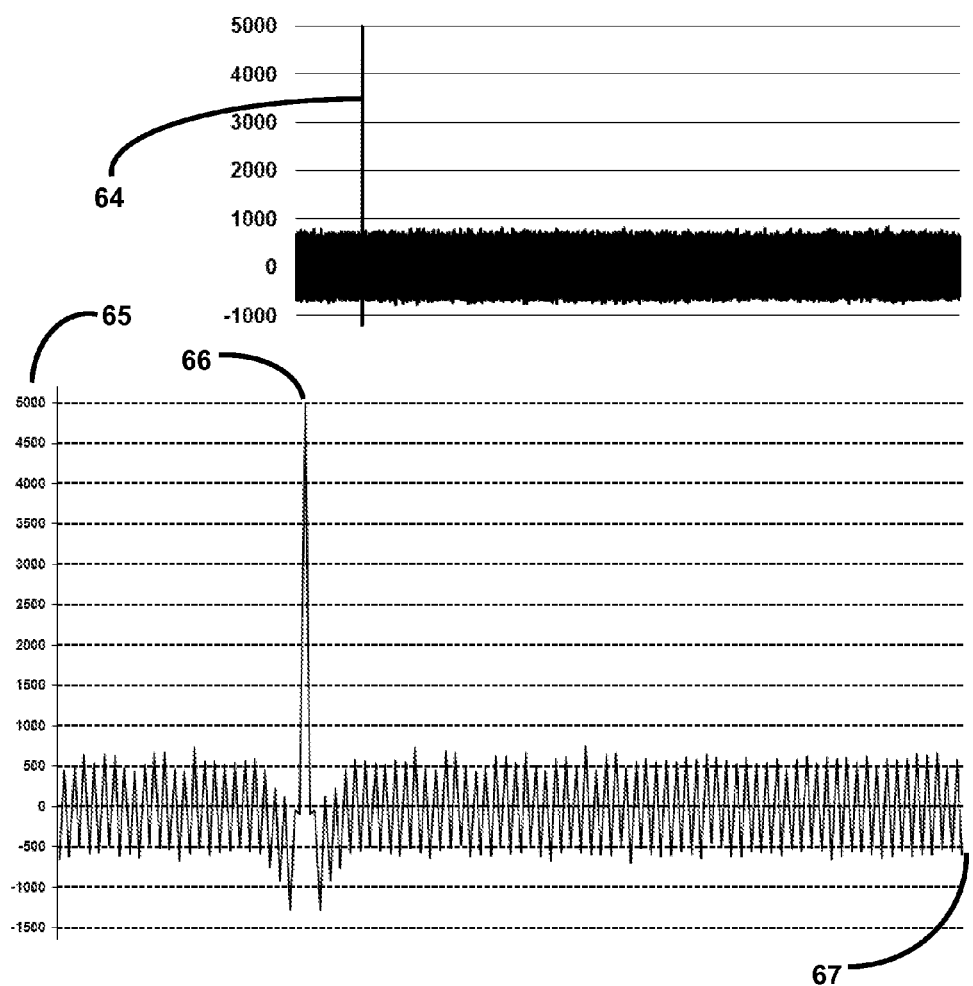
*FIG. 7B* AUTOCORRELATION EXAMPLES WITH PSEUDORANDOM NOISE EMULATION, ORDER 10, 5000 CHIP LENGTH, 10 MEGAHERTZ CHIPPING RATE

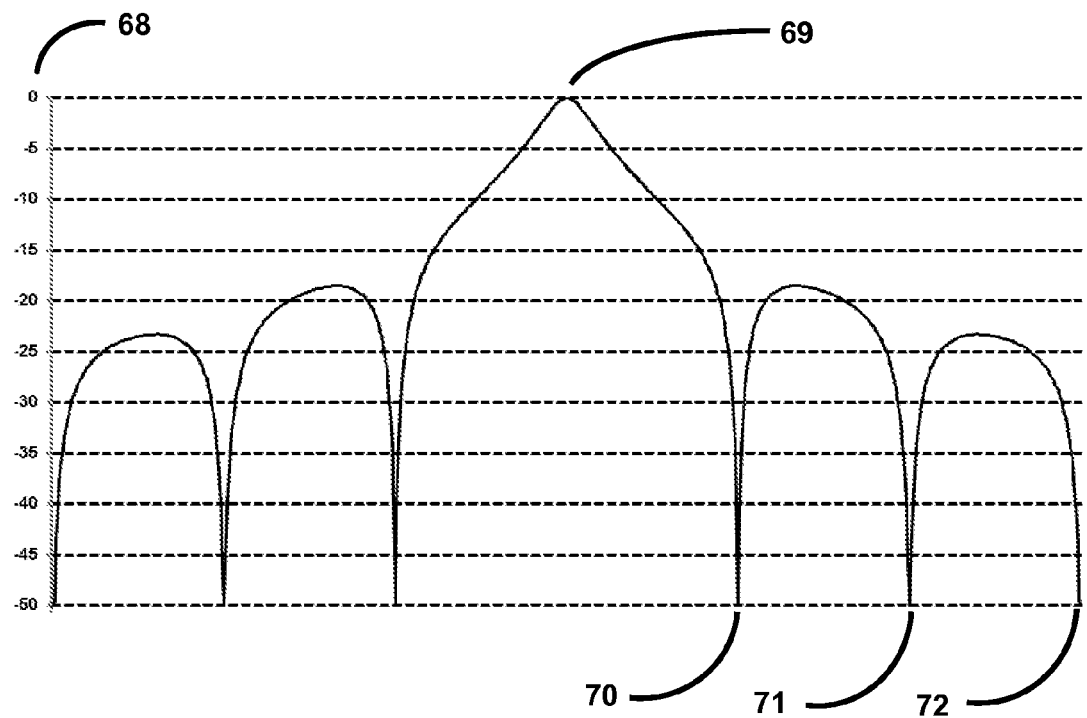
FIG. 7C POWER SPECTRAL DENSITY IN DB SCALE, ORDER 10 PSEUDORANDOM NOISE CONFIGURATION, 10 MEGAHERTZ CHIPPING RATE

*FIG. 8A*  EXAMPLE GAUSSIAN QUARTER BANDWIDTH CONFIGURATION
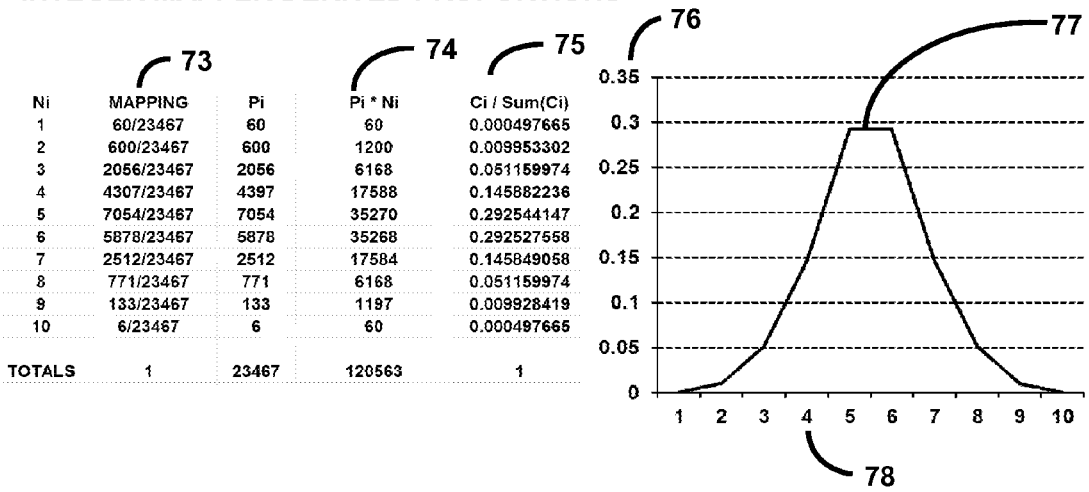

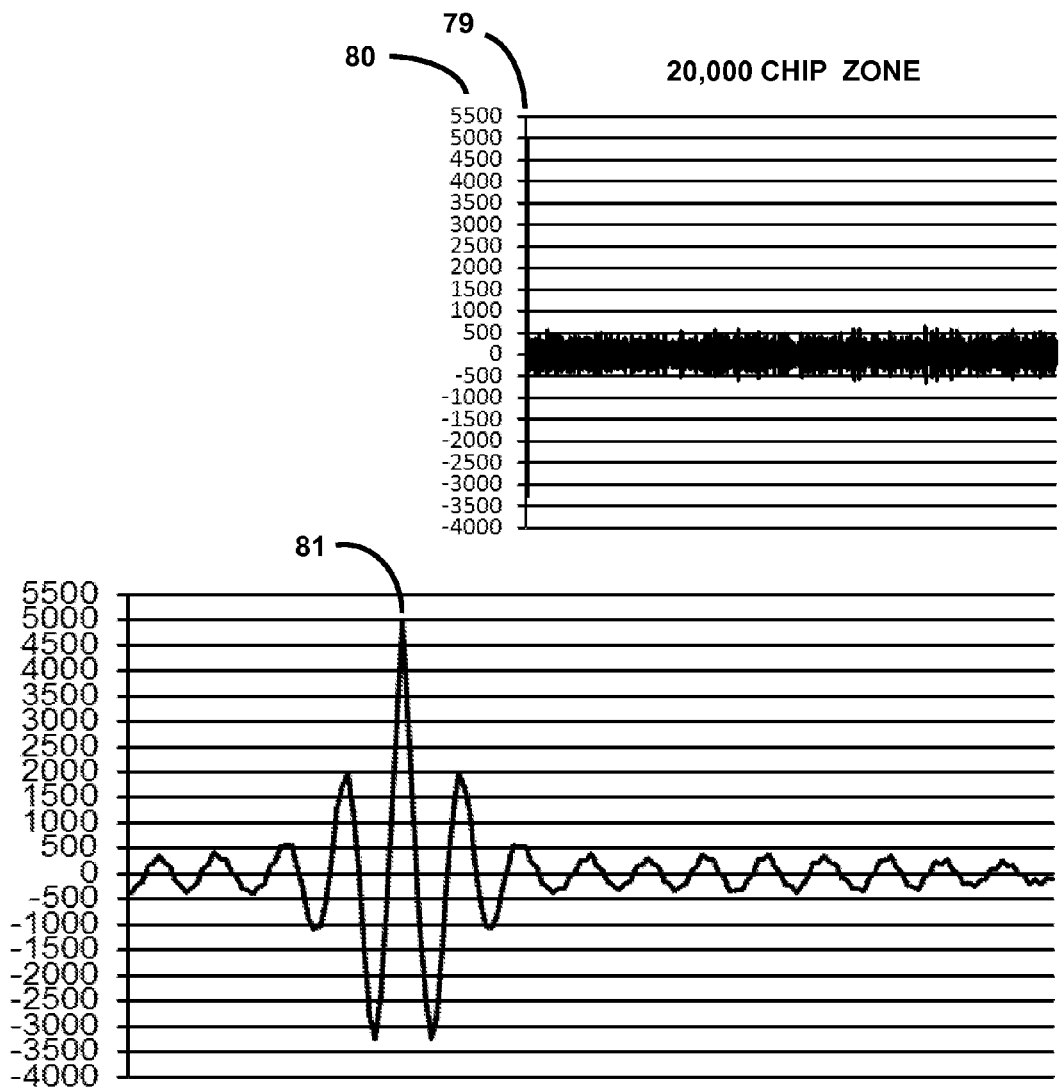
FIG. 8B  5000 CHIP AUTOCORRELATION FOR GAUSSIAN QUARTER BANDWIDTH CONFIGURATION, 10 MEGAHERTZ CHIPPING RATE

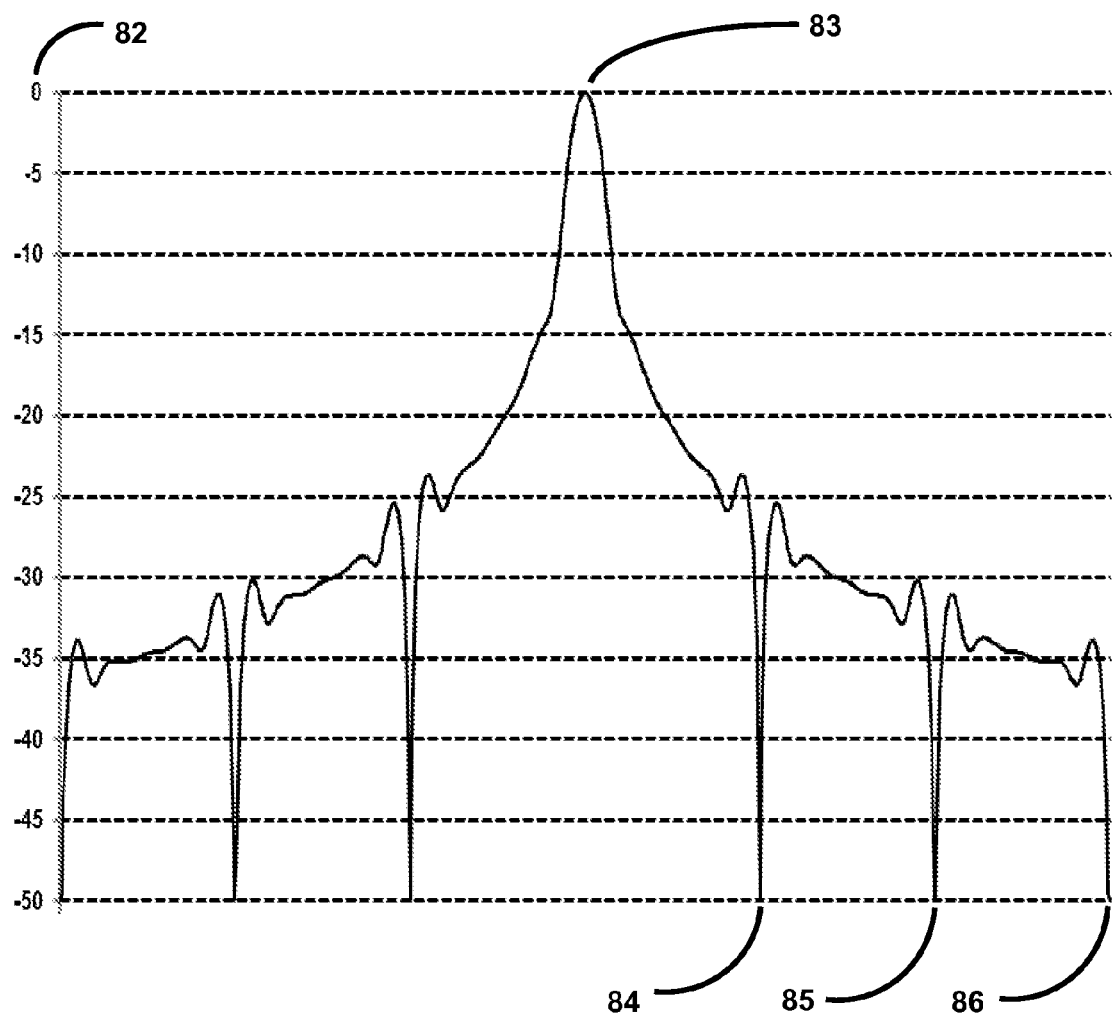
FIG. 8C POWER SPECTRAL DENSITY DB SCALE OF AN ORDER 10 GAUSSIAN QUARTER BANDWIDTH CONFIGURATION, 10 MEGAHERTZ CHIPPING RATE FIG. 9A  RANDOM NON-CYCLICAL BINARY CODE S-CURVE WITH A 2 CHIP OFFSET, FOR A PSEUDORANDOM NOISE CONFIGURATION, 5000 CHIP CORRELATION WITH A 10 MEGAHERTZ CHIPPING RATE
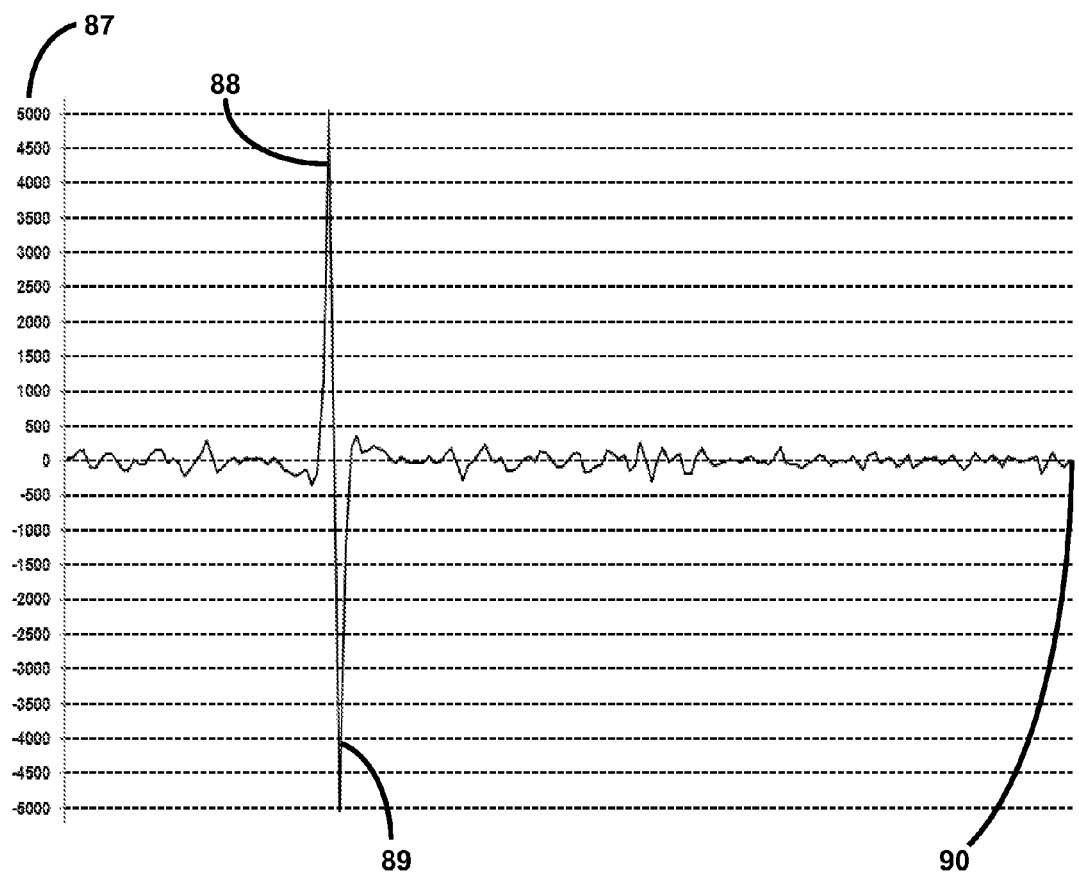

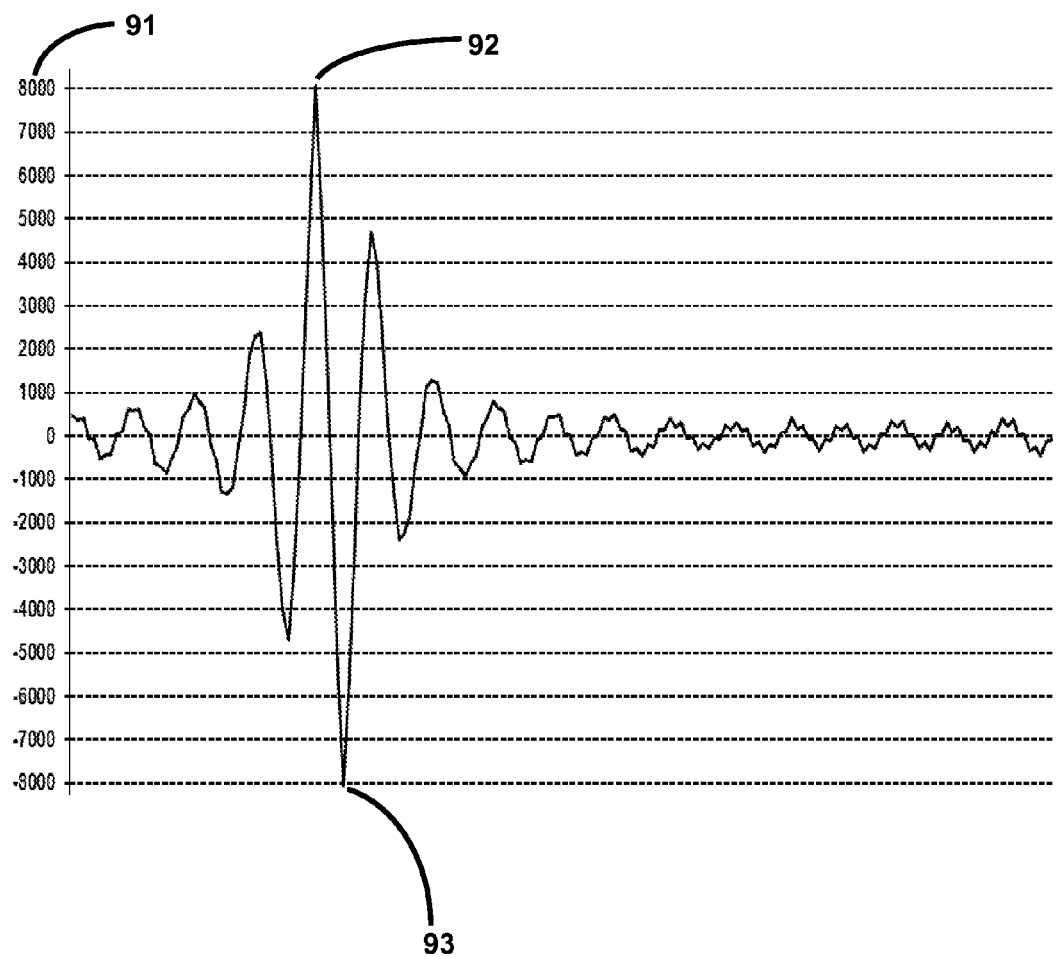
FIG. 9B  RANDOM NON-CYCLICAL BINARY CODE S-CURVE WITH A 5 CHIP OFFSET, FOR A GAUSSIAN QUARTER BANDWIDTH CONFIGURATION, 5000 CHIP CORRELATION WITH A 10 MEGAHERTZ CHIPPING RATE

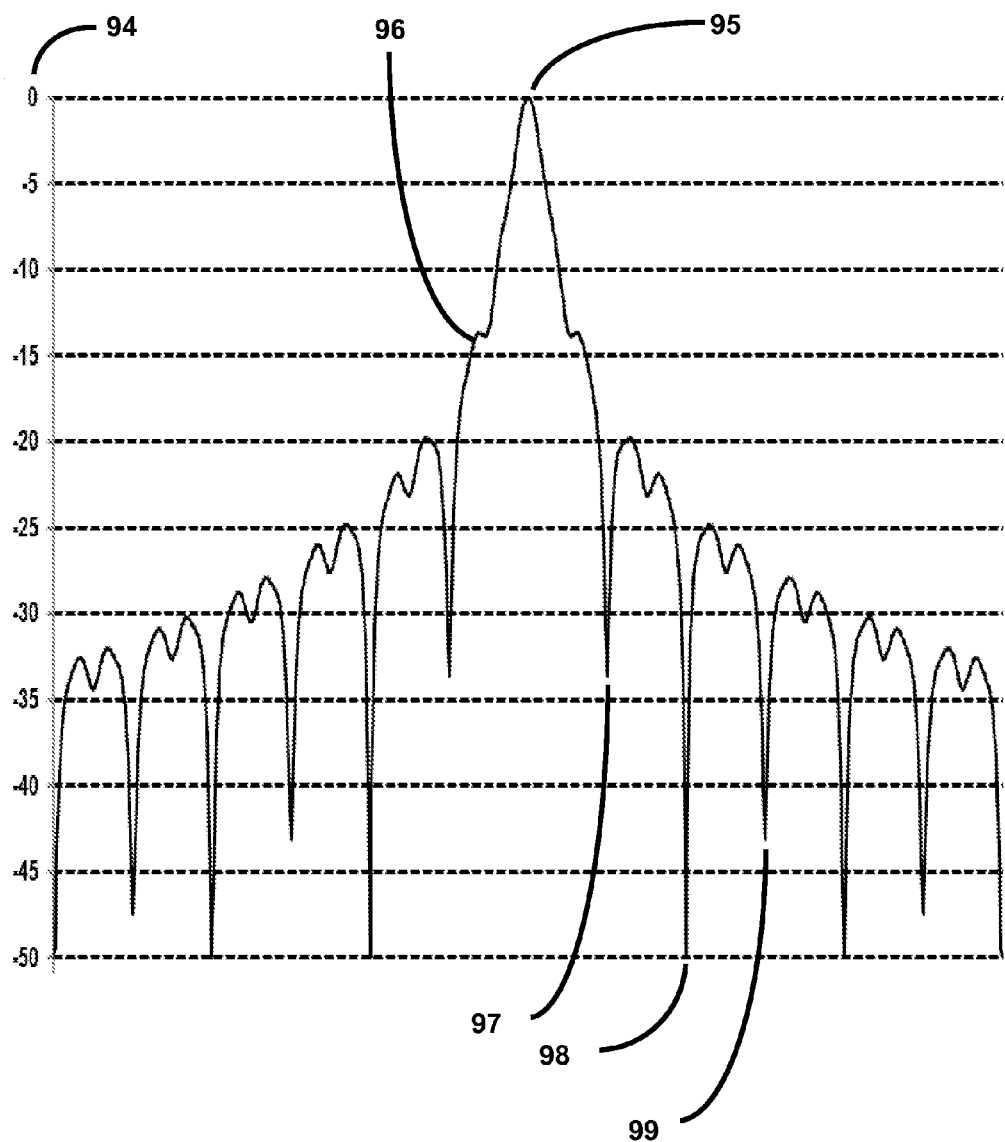
*FIG. 10A* RANDOM NON-CYCLICAL BINARY CODE EXTREME SPECTRUM TAILORING EXAMPLE CONFIGURATION, SELECTED 2 CHIP, 4 CHIP, 8 CHIP, and 10 CHIP DOMINANT PULSE WIDTH, 10 MEGAHERTZ CHIPPING RATE

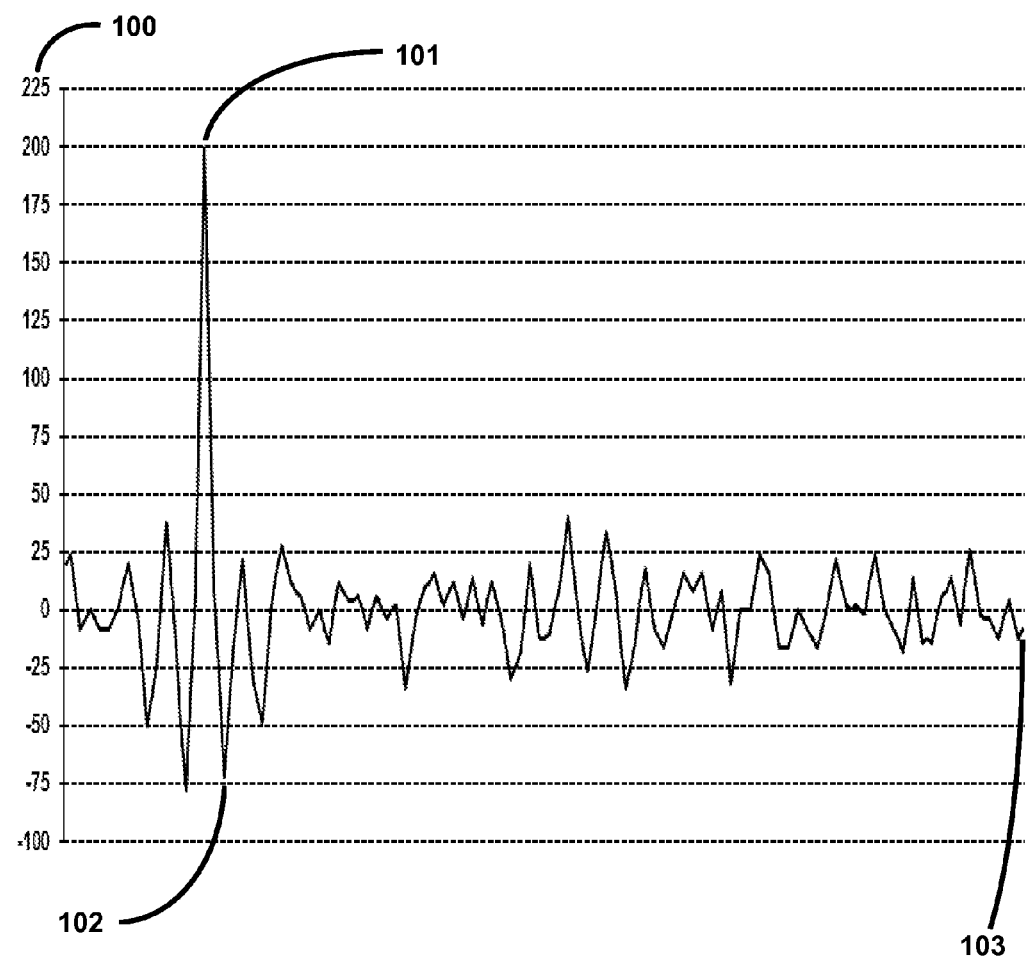
FIG. 10B  RANDOM NON-CYCLICAL BINARY CODE 200 CHIP AUTOCORRELATION PERFORMANCE, 10 MEGAHERTZ CHIPPING RATE, 5 MHZ BANDWIDTH AT -15 DB POINTS FIG. 11    EXAMPLE ORDER 10 CODE PARAMETERS FOR
PSEUDORANDOM NOISE CONFIGURATION,
10 MEGAHERTZ CHIPPING RATE

⸺ 104

RANDOM NON-CYCLICAL BINARY CODE RANDOMIZE SEED = 100102880

FIRST FIVE ROWS ACROSS TEN
100-INTEGER COLUMNS 4 2 1 7 1 2 1 2 4 2          105
1 2 1 2 3 1 2 2 1 1
1 1 5 3 1 1 1 1 2 1
3 2 4 1 1 1 1 3 7 1
4 1 1 2 2 4 1 4 1 1

10 BY 10 ADDRESS MATRIX:

MyScramble(1) = 10 9 8 7 6 5 4 3 2 1
MyScramble(2) = 9 8 7 6 5 4 3 2 9 10
MyScramble(3) = 8 7 6 5 4 3 2 8 10 9
MyScramble(4) = 7 6 5 4 3 2 7 10 9 8
MyScramble(5) = 6 5 4 3 2 6 10 9 8 7
MyScramble(6) = 5 4 3 2 5 9 10 8 7 6
MyScramble(7) = 4 3 2 4 10 9 7 8 6 5
MyScramble(8) = 3 2 3 10 9 8 7 5 6 4
MyScramble(9) = 2 2 10 9 8 7 6 5 3 4
MyScramble(10) = 1 10 9 8 7 6 5 4 3 2

RANDOM INTEGER MAPPING
FOR PSEUDORANDOM NOISE
CONFIGURATION

106

Zone Width(1) = 5120
Zone Width(2) = 2560
Zone Width(3) = 1280
Zone Width(4) = 640
Zone Width(5) = 320
Zone Width(6) = 160
Zone Width(7) = 80
Zone Width(8) = 40
Zone Width(9) = 20
Zone Width(10) = 10

TOTAL:        10230

⸺ 108

107

FIRST 200 EXTENDED PSEUDORANDOM NOISE EXTENDED RANDOM INTEGERS 2 4 2 1 2 1 7 1 2 4 1 1 2 2 1 3 2 1 2 1 1 2 1 1 1 1 3 5 1 1 1 7 3 1 1 1 1 4 2 3 1 1 4 1
4 2 2 1 1 4 1 3 1 1 1 3 4 2 1 1 2 3 1 3 2 1 3 1 1 1 2 1 1 2 2 1 2 1 1 2 1 1 1 2 2 1 2 7
3 1 1 1 1 1 1 2 3 1 1 1 1 1 1 2 2 1 1 3 1 3 4 1 1 1 2 1 7 2 5 1 1 1 3 1 3 1 1 1 1 2 1 2
2 2 1 4 2 1 3 2 2 3 1 1 1 1 2 1 1 1 1 2 2 1 2 2 2 1 3 3 2 1 3 1 1 1 1 1 1 2 2 1 1 1 2
2 1 1 2 1 1 3 1 3 5 2 2 2 1 1 2 4 4 1 3 2 1 1 1
                                                                                      109
FIRST 200 CHIPS FROM EXTENDED PSEUDORANDOM NOISE
RANDOM INTEGERS 1100111100001100101100101111111000000010110011110000101011001100101110
0011001011001010110010101010111000111110000010101011111110000000111000
101010101111000011001110001010111100010111100001100110010 10

FIG. 12     EXAMPLE ORDER 10 CODE PARAMETERS FOR
GAUSSIAN QUARTER BANDWIDTH CONFIGURATION,
10 MEGAHERTZ CHIPPING RATE

— 110

RANDOM NON-CYCLICAL BINARY CODE RANDOMIZE SEED = 100102880

FIRST FIVE ROWS ACROSS TEN
100-INTEGER COLUMNS:

7 6 4 8 4 6 5 5 7 6     111
4 6 5 5 6 4 6 5 4 4
5 3 8 6 4 3 4 5 6 5
6 5 7 5 2 5 5 7 8 3
7 5 5 5 6 7 5 7 5 5

10 BY 10 ADDRESS MATRIX:

MyScramble(1) = 10 9 8 7 6 5 4 3 2 1
MyScramble(2) = 9 8 7 6 5 4 3 2 9 10
MyScramble(3) = 8 7 6 5 4 3 2 8 10 9
MyScramble(4) = 7 6 5 4 3 2 7 10 9 8
MyScramble(5) = 6 5 4 3 2 6 10 9 8 7
MyScramble(6) = 5 4 3 2 5 9 10 8 7 6
MyScramble(7) = 4 3 2 4 10 9 7 8 6 5
MyScramble(8) = 3 2 3 10 9 8 7 5 6 4
MyScramble(9) = 2 2 10 9 8 7 6 5 3 4
MyScramble(10) = 1 10 9 8 7 6 5 4 3 2

RANDOM INTEGER MAPPING
FOR GAUSSIAN QUARTER
BANDWIDTH
CONFIGURATION
112

Zone Width(1) = 60
Zone Width(2) = 600
Zone Width(3) = 2056
Zone Width(4) = 4397
Zone Width(5) = 7054
Zone Width(6) = 5878
Zone Width(7) = 2612
Zone Width(8) = 771
Zone Width(9) = 133
Zone Width(10) = 6

23467

113             114

FIRST 200 EXTENDED GAUSSIAN RANDOM INTEGERS 6 7 5 5 6 4 8 4 6 7 4 4 5 6 4 6 5 5 6 4 5 6 5 4 3 4 6 8 3 5 3 8 7 5 5 2 5 7 5 6 5 5 7 5
7 6 5 5 5 7 2 6 3 3 4 7 7 5 4 5 6 7 5 6 5 5 6 4 3 3 5 4 4 6 6 4 6 4 3 5 5 4 5 6 5 4 5 8
6 4 5 3 4 4 5 6 6 3 5 4 5 5 2 5 5 4 3 6 4 6 7 3 4 3 5 4 8 5 7 5 5 4 7 5 6 5 3 4 5 6 4 5
5 6 3 7 6 4 6 5 6 6 5 5 5 4 5 4 4 3 5 5 5 6 6 5 5 6 6 6 5 7 4 4 5 4 3 5 6 6 4 3 4 5
6 1 4 6 3 5 6 5 6 7 5 5 5 4 4 6 7 7 5 6 5 4 3 4

115

FIRST 200 CHIPS FROM EXTENDED GAUSSIAN RANDOM
INTEGERS 1111110000001111111000000011110000111100001111100000011110000111111
1110000000011110000111110000001111110000000111000011100001111100000
0111111000000111100001111100000011111000001111100000111111

RANDOM NON-CYCLICAL BINARY CODE GENERATOR

CROSS-REFERENCE TO RELATED APPLICATIONS

| Application number | Filing Date | Patent number | Issue Date |
| --- | --- | --- | --- |
| 109,432 | October, 1987 | 4,837,790 | June, 1989 |
| 380,959 | July, 1989 | 4,928,310 | May, 1990 |
| 389,284 | August, 1989 | 5,031,130 | July, 1991 |
| 163,161 | December, 1993 | 5,469,469 | November, 1995 |
| 331,925 | October, 1994 | 5,488,631 | January, 1996 |
| 428,389 | April, 1995 | 5,596,516 | January, 1997 |
| 432,905 | May, 1995 | 5,724,383 | March, 1998 |
| 432,913 | May, 1995 | 5,761,239 | June, 1998 |
| 432,907 | May, 1995 | 5,790,591 | August, 1998 |
| 329,473 | June, 1999 | 6,091,760 | July, 2000 |
| 215,463 | December, 1998 | 6,445,714 | September, 2002 |
| 751,782 | December, 2000 | 6,567,017 | May, 2003 |
| 034,554 | December, 2001 | 6,667,708 | December, 2003 |
| 832,067 | April, 2001 | 7,386,026 | June, 2008 |
| 103,266 | April, 2005 | 7,411,993 | August, 2008 |
| 517,985 | September, 2006 | 7,930,623 | April, 2011 |
| 399,953 | April, 2006 | 8,102,900 | January, 2012 |

Current U.S. Class: 375/150, 200, 206, 142, 145, 146, 149, 208; 380/31, 34, 42

Current International Class: H04B, H04L. H04J. H04B, H04K

Field of Search: 375/200, 206, 208, 209, 210; 380/1, 9, 28, 31, 42, 200, 206

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

TECHNICAL FIELD AND INDUSTRIAL APPLICABILITY OF THE INVENTION

This invention relates to the field of random code generators for binary code digital signal processing, and more particularly to a random non-cyclical binary code generator of binary code chipping streams used in signal processing to spread and de-spread digital-coded spread spectrum signals.

BACKGROUND OF THE INVENTION

A prior art binary code generator creates cyclical chipping sequences from a binary shift register with fixed feedback taps. A specific length shift register generates codes that are cyclical with fixed autocorrelation and cross-correlation parameters and fixed broadband power spectral density characteristics. This results in an unchangeable broadband power spectral density profile fixed by code chipping rates. These codes support low data-rate-to-bandwidth ratios resulting in inefficiencies in communications spectrum usage and fixed power spectral density profiles.

A common prior art binary code generator used in signal processing is a pseudorandom noise code generator of chipping sequences. These codes require binary feedback shift registers to create chipping streams used to phase modulate carrier frequencies parallel to lower-rate data modulation schemes resulting in spread spectrum transmit bandwidths much greater than the data bit rate transmitted.

The prior art receiver local shift register code generator produces a local chipping stream replica of the transmitted code. This local replica is precisely delayed from universal time consistent with communications range delays. Controlled delayed versions of the local synchronized chipping patterns are produced from a plethora of delay mechanisms and to sense autocorrelation peaks, acquire, and track received spread spectrum codes. In turn, the autocorrelation process collapses the spread spectrum bandwidth to a lower data symbol bandwidth, and data synchronization and extraction is completed.

The shift register code generator has a cyclical repeat length that constrains the unique autocorrelation chip length usable in the receiver de-spreading processes. This repeating cycle length is a basic characteristic when a binary feedback shift register is used. An N-length shift register is the source of a pseudorandom noise code order N. This shift register has a limited length of non-repeating chip patterns defined by the expression: $L=(2^N)-1$, where L is the repeating pattern chip count and N is the shift register length. This creates a cyclical repeating code that is unusable for communications non-redundant ranging or communication signal synchronization constrained to a range inside an L chips limit. A longer shift register code is required to resolve this range redundancy and achieve high autocorrelation gains while still providing a short time to acquisition. Two transmissions and codes are required to efficiently complete the acquisition and tracking over a long range uncertainty of the connection. The code power spectral density profile is fixed for every prior art code chipping rate that creates a one-sided null at the carrier offset equal to the code chipping rate in hertz. This is a constraint common to all binary feedback shift register code generators, creating a fixed profile of the transmitted power spectral density for all codes. This power spectral density includes significant side lobes at each multiple of the chipping rate, creating near-carrier interfering power levels for nearby receiver channels. Additionally, a separate family of data symbol demodulation processes is required for baseband digital data that degrades the prior art code tracking process, reducing data throughput capability, and spectrum efficiency.

Prior signal processing methods also use complex pulse shaping and combined amplitude and phase shift processes to define data symbols to increase spectrum efficiency at the expense of range-rate tracking performance, complexity, and cost. Recent new modulation methods, such as code shift keying, do increase spectrum efficiency, but require large numbers of orthogonal binary codes with near-ideal cross-correlation parameters. Large numbers of such orthogonal codes are not possible using prior art shift register codes. The shift register cyclical codes of today are complex and have only a small numbers of ideal codes that have the acceptable cross-correlation characteristics for code division multiplexing or code shift keying modulation methods. The cyclical code generator configurations are very selective and complex with a small range of versatility. The power spectrum is always governed by the spectrum of a pseudorandom noise code and its chipping rate. The result is spectrum usage inefficiencies and side lobes that require complex transmit and receive filtering processes and large separations of carrier frequencies.

In view of the limitations in the prior state-of-the-art shift register code generators, it would be advantageous to have a binary spread spectrum code generator that produces a non-repeating chipping sequence over a long epoch of code. It would also be advantageous to have a code configuration capability of tailoring binary code pulse width probability distributions to create varied power spectral densities and bandwidths without changing code chipping rates. Finally, it would be advantageous to have non-cyclical code characteristics that allow both short autocorrelation periods and long autocorrelation periods to be processed concurrently using one binary orthogonal code in a long epoch. These advantages would result in many options for both code division multiplexing and code shift key modulation choices would enable high spectrum data throughput efficiency and low hardware complexity.

BRIEF SUMMARY OF THE INVENTION

The invention provides a random non-cyclical binary code generator in which the generation process does not involve binary feedback shift registers or associated complex logic feedback methods, pulse shaping, or output spectral filters. The prior art binary codes, such as pseudorandom noise feedback shift register codes, are all replaced with a fully configurable, random, non-cyclical binary code generator creating chip pulse streams and pulse width probability distributions that can be configured for different power spectrum profiles and autocorrelation and cross-correlation parameters. Orthogonal codes of any length are one-time events within each 10-minute epoch. This allows continuously changing multiple-length, orthogonal codes to be concurrently correlated during any epoch. The non-cyclical characteristic provides unique range delay measurements throughout a long epoch using a many short orthogonal random binary codes. After synchronously retrieving all extended random integers from the pre-stored 10-minute epoch memory, the retrieve process rolls over to a new future pre-stored 10-minute epoch memory. This rollover is seamless and the new epoch memory is re-designated the present epoch. A new future epoch is instantly re-stored in the prior memory block while time-synchronous integer retrieval process are ongoing. Each orthogonal epoch is created using a unique randomize key supplied to the off-the-shelf random number generator. The random non-cyclical binary code generator embodiment creates these non-cyclical forms of random code integer sequences across a selected epoch of 10 minutes that is pre-stored as a present epoch or a future epoch. The present epoch integers are retrieved under precise Global Positioning System (GPS) universal time reference control and are converted to chipping pulse pairs immediately upon retrieval. Integer-to-chip conversion creates one all ones (1s) pulse of chips followed by one all zeros (0s) pulse of chips, each equal in chips count to the value of the extended random integer retrieved. The random non-cyclical binary code generator embodiment chipping rate is fixed at 10 megahertz (MHz) for all configurations presented in this embodiment. An epoch is a unique orthogonal sequence of non-cyclical extended random integers convertible to chip pulse pairs that total exactly 6 billion chips for each 10-minute epoch corresponding to a chipping rate is 10 MHz. An accumulating chip count is tracked during the extended random integer epoch loading process to sense the last integer where the converted chip count would be equal to or greater than 6 billion chips. At this point, the very last extended random integer is modified, as required, to force the remaining chips to be an exact-fit pulse pair at the end of the 10-minute epoch of pulses. Multiple 10-minute epochs occur during the calendar year, numbering 52,560 epochs in a 365-day year for all random non-cyclical binary codes.

Multiple generator configurations are described in this embodiment to describe the associated power spectrum and autocorrelation profiles for a few examples. These include emulated pseudorandom noise random non-cyclical binary code, a Gaussian quarter bandwidth random non-cyclical binary code, and a case where only selected pulse widths dominate the decimal-to-integer mapper output. The result is a unique power spectrum profile and autocorrelation profile. A single chipping rate of 10 MHz is used for all configurations in this embodiment. However, a plethora of chipping rates is configurable.

A pseudorandom noise code emulation is a random non-cyclical binary code with a two-sided bandwidth consistent with a 10 MHz chipping rate. This is achieved by configuring the pulse width chip count distributions between widths of 1 to the code order to be consistent with the pseudorandom noise pulse width probability distribution. Chipping totals per pulse width determine the resulting spectrum profile:

$$Ci=(Pni*Ni)/\text{Sum Over All } i(Pni*Ni)$$

Pni is an integer number of pulses of width n, and Ni is the chips per this pulse width. The probability of a pulse width, PWi, at the output of the decimal-to-integer mapper is expressed as:

$$PWi=Pni/\text{Sum Over All } i(Pni)$$

In all pseudorandom noise code emulations, each target power spectrum profile is forced by fixed values of PWi set in the decimal-to-integer converter.

In all non-pseudorandom noise codes, each target power spectrum profile is defined by first selecting Ci constants that will create a target power spectrum profile. Then the PWi mapping is derived from the Pni values. The decimal-to-integer mapper is fixed to PWi mapping parameters that are slave to the Ci constants selected.

The number of unique random non-cyclical binary codes in this embodiment are practically unlimited with the configurations presented representing a small subset of all possible orthogonal code configurations. The only visible non-repeating limitation in the random non-cyclical binary code generator is found in the selected state-of-the-art random decimal number generator that is commonly $2^{24}$, or 16,777,216 random decimal numbers that represent the random decimal number limit of non-repeating integer patterns. The invention random integer sequence extender expands any random integer sequence length to 1,000 times the original random number generator integer output without modifying the statistical distribution of the original sequence. In this preferred embodiment, the chipping rate is fixed at 10 MHz and the extended random integer process contains fixed parameters consistent with chipping epochs of 6 billion chips per 10 minutes. The decimal-to-integer mapper parameters, the random integer sequence extender parameters, and the randomize keys for each epoch are configurable. This configurability allows random non-cyclical binary code generator chipping streams of 6 billion chips per 10-minute epoch, forming constantly changing short and long orthogonal codes in each epoch over years of code generation.

All non-cyclical binary random code generator chipping streams are time synchronized to GPS universal time. Variations in transmit time of day and receive time of day are selectable by the random non-cyclical binary code generator with 1 chip accuracy within the range uncertainty of the supported communications receiver and transmitter. Startup within an epoch of code is accomplished by retrieving extended random integers from the pre-stored current epoch of integers for that code and converting integers to binary pulse pairs. These pulse pairs are immediately concatenated to a chipping clock-shifting memory with a chipping width of twice the range uncertainty of the communications links. The code chipping stream is fast-forwarded and loaded into a clock-shifted chipping memory until the code phase equals the current GPS universal time in chip counts at the midpoint of the left-shifting chip memory. The center chip forms a binary chipping stream output precisely synchronized to the GPS universal time reference. When code phase is fast forwarded to this point, the time of day chipping clock is gated on to control the left-shifting memory to maintain precise universal time code synchronization. Steady-state rollover from present epoch to future epoch occurs seamlessly, designating the future epoch memory to be the new present epoch memory after rollover. A new future-extended random integer memory is immediately filled asynchronously at the highest processor speeds possible.

A plethora of random non-cyclical binary codes beyond the scope of this embodiment are configurable for 10 MHz chipping rates via settings of the decimal-to-integer mapper and the variations in the randomize seed selection algorithm settings. These changes tailor the transmission spectrum for any spectrum profile from 1 MHz to twice the chipping stream in two-sided spectrum bandwidths. Further, chipping rates and code orders are configurable in the random non-cyclical binary code generator that can create a narrow or broad bandwidth spectrum and tailor new autocorrelation parameters that match receiver environments and data throughputs.

All random non-cyclical binary codes in transmit or receive modes can be synchronized to local code phases available at any of the left-shifting memory slots. This code phase variation extends from lead times up to the range uncertainty in chips and delay times up to the range uncertainty in chips.

A wide range of autocorrelation techniques are available to establish receiver precision time of day for a selected orthogonal code. Further, a large number of code orders are configurable with a fixed 10 MHz chipping rate, allowing the use of any code order that is practical for the target autocorrelation characteristics. In all cases, the dominating pulse widths determine the spectrum characteristics. A plethora of pulse width probability zones in the decimal-to-integer mapper can establish the distribution of binary pulses. A binary pulse distribution can be designed for any target power spectral density and associated bandwidth. Dominate pulse widths can be configured to include all possible pulse widths, or a smaller group of dominate pulse widths and a minor distribution of the remaining pulse widths. This patent includes examples of each of these configurations.

BRIEF OVERVIEW OF THE PRINCIPLES OF CONFIGURATION AND OPERATION

The random non-cyclical binary code generator contains a state-of-the-art random decimal number generator that typically can create non-repeating random decimal number sequences as long as $2^{24}$ or 16,777,216 random decimal numbers before repeating the sequence. In this invention, each of these decimal numbers is converted to one of 10 unique integers for an order 10 random non-cyclical binary code. The integer sequence is then extended in length by a factor of 1,000 and directly pre-stored into a complete epoch memory of integers that can precisely be converted to 6 billion chips worth of chip pulse pairs. The last extended random integer in an epoch is modified in value to create the exact pulse pair of chips that matches a 6 billion chip count for the 10-minute epoch of integers. This is consistent with a 10-minute epoch with a chipping rate of 10 MHz. A present and a future epoch of integers are pre-stored at startup to support a seamless rollover to the next epoch. The present epoch is the source of all extended random integers used for creating synchronized sequences of random non-cyclical binary code generator chipping pulse pairs. When both epoch memories are filled, a left-shifting chipping memory is initialized in chipping code phase to GPS universal time. After a fast forward operation to a universal time synchronization point, a chipping clock is gated on to sustain the synchronized flow of left-shifting chips into the left-shifting memory. The direction of chip memory shifting is described as a standard left, but is configuration selectable. Each integer read from the present epoch of extended random integers is immediately converted to a pulse pair defined as an all ones (1s) pulse followed by an all zeros (0s) pulse with each pulse width equal to the value of the integer retrieved from the present epoch memory. The chipping pulse pair is concatenated to the lead or right end of the left-shifting memory at a defined memory block of the shifting memory under universal time reference event control. The left-shifting chipping memory is driven by the chipping clock running at the chip rate of 10 MHz. Pulse pair concatenation occurs between the chipping clock pulses within a 100 nanosecond window. All phases of the universal time synchronized chipping code are available, consistent with the range uncertainty, by selecting any of the delayed memory locations or the lead memory locations in the left-shifting chipping memory as a local code source. The range uncertainty of the communications link determines the width of the left-shifting memory block in chips. For example, for a 300-nautical mile range uncertainty, a 2-millisecond delay block of chips is sufficient with a matching 2-millisecond lead block of chip memory slots. With a chipping clock of 10 MHz, this corresponds to a delay left-shifting memory block of 20,000 chips across 2 milliseconds and an equal width lead memory block.

The epoch integer count for a 10-minute epoch requires the extended non-repeating integer sequence length to be larger than the random number generator random integer source by a factor of 1,000. The total chip count associated with each epoch equals the sum of all extended random integer values in memory times two that precisely equals an epoch of 6 billion chips for a 10-minute epoch. The last integer in the epoch is adjusted to make the 6 billion chips exactly without splitting the last pulse pair.

There are three primary configuration principles for a random non-cyclical binary code generator. The first is random integer extender principle for achieving 1,000 times the source random integer sequence length. The second is the configuration principle for tailoring a random non-cyclical binary code for a target power spectral density profile. The third is the synchronization principle of maintaining seamless outflow of chips from a present epoch of extended random integers in memory to a universal time-shifting chip memory, defining the random non-cyclical binary code lead time and delay time phases.

The random integer extender principle includes three independent multiplier means of extending source random integer sequence lengths. The first multiplier means is the blocking of source random integers from the random number generator integer mapper output into 10 columns of a selected length for an order 10 code. In the embodiment, the column length is 100 integers with 10 columns in the block. Other code orders are similarly configurable. New random integer blocks are created by adding only one new column and deleting the oldest existing column. This process creates a 10 times multiplier. The second multiplier means is the reconfiguration of a unique 10-column block of selected random integers. A unique 10-column block configuration is defined by a selected shuffle of the column order in the block. The original 10-column block can be arranged in at least 50 possible shuffle configurations, but only 10 unique column shuffle blocks are needed to provide a 10 times multiplier. The third multiplier means applies a fixed set of indirect addressing indexes of 10 columns of unique integers, 1 to 10, with 10 rows each for an order 10 code. Duplicates of index numbers are minimized across the 10 rows and in the single diagonal of the addressing block. Each integer in a row of the addresses is a pointer index used to define the next block row position for selection of the next extended random integer. The index address row points to random integers, row by row, until the random integer block is exhausted. The next row of the 10 indirect addresses is then used for the next extended random integer readout of the same random number block of columns. This process creates a standalone multiplier of 10 times the original block of random integers. The product of the three extended random integer multipliers in this case is 1,000 times the source random integer block. The source random number generator and integer mapper produces over 16 million random integers without repeating the sequence. This extended random integer count based on at least 16 million source random integers will be 16 billion extended random integers. Less than 6 billion integers are required to define an epoch of 6 billion chips in pulse pairs.

The random non-cyclical binary code generator integer mapper configuration following the random number generator output is used to configure extremely large numbers of unique power spectral density profiles independent of the embodiment chipping rate of 10 MHz. The principles of configuring the integer mapper establish the probabilities of a unique integer occurring over a total possible number of integers, contributing to a pre-stored epoch of extended random integers. The power spectrum of an epoch of extended random integers is determined by the integer mapper output. During the synchronous retrieval of the extended random integers, all integers are directly converted to pulse pairs. A normalized power spectrum for a variable multiplier, $C_i$, is found in the expression:

$$C_i * \{SIN(\pi * f * T_i)/(\pi * f * T_i)\}^2$$

In this expression, the $T_i$ is the pulse width in chips and the $f$ is the specific frequency offset from the center frequency of the power measurement profile. This expression is normalized to a summation peak power of 1.00 exactly with each of 10 pulse widths contributing to this peak power and spectrum profile. Each unique pulse width represents a fixed power profile contribution to a total carrier frequency power spectrum. The $f$ is actually the frequency offset from a center carrier frequency $F_o$ where $f$=absolute value ($F_o$–$F_{offset}$). Each of ten terms in order 10 codes contribute to the summed value of the total power spectrum value at the point $f$ in the expression. If an order 10 code is used, the summing will include 10 expressions. The $C_i [(SIN x)/(x)]^2$ represents a normalized spectrum with a peak value of 1.0 at $f$=0 for the total of all of the power peaks. The multiplier $C_i$ is, therefore, a normalized fraction such that the Sum over i of $C_i$ at center frequency is equal to 1.00 exactly with each term representing the proportion of total chips dedicated to the pulse width value of i. The breakdown of $C_i$ is therefore $(P_{ni}*N_i)/(\text{Total over } i(P_{ni}*N_i))$ where $P_{ni}*N_i$ is the number of pulses times the chips in each pulse in a large sample of binary pulses. In this embodiment, the sample begins at 200 chips and takes on values up to thousands of chips. A second normalization is required to define each pulse width probability, $PW_i$, where $PW_i$=Probability of a pulse width i occurring in a decimal-to-integer mapper. The $N_i$(chips per integer) corresponds to the pulse width value. In this patent, the 2 in a pulse pair is ignored in the normalization process.

In only one case, the pseudorandom noise emulation, is the $PW_i$ first defined, followed by the direct calculations of the associated $C_i$. This case derives the power spectrum profile from the $PW_i$ values. All other configurations derive the $PW_i$ pulse distributions based on a target set of $C_i$ forming a specific power spectral density profile.

The pseudorandom noise emulation configuration results in a power spectrum profile and autocorrelation characteristics that are very close to the natural shift register pseudorandom noise cyclical binary code family. However, the random non-cyclical binary code version does not repeat every 1023 chips for an order 10 code, but continues to create ever-changing orthogonal chipping codes of all lengths as the epoch progresses and throughout all future epochs. The emulated pseudorandom noise random non-cyclical binary codes are, therefore, more robust in continuous short- or long-range detection and tracking autocorrelation processes using a single code.

In all other spectral configurations for a near-infinite number of orthogonal random non-cyclical binary codes, a target set of $C_i$ is first selected to estimate a target power spectrum profile. In the extreme power spectrum tailoring example applicable to FIG. 10A and FIG. 10B, the power spectrum is selected where the $C_i$ dominating constants are defined as:

$$C2=100/1,000, C4=400/1,000, C8=400/1,000, \text{ and } C10=100/1,000$$

Note that the sum of the numerator values is 1,000 consistent with a percent normalization. Each numerator is a product of $N_i*P_{ni}$. With all $N_i$ known values, each $P_{ni}$ pulse count can be derived as $C_i(\text{numerator})/N_i$ to define each $P_{ni}$ value. These values are:

$$P2=100/2, P4=400/4, P8=400/8, P10=100/10$$

Therefore, these four $P_{ni}$ pulse count values are:
  50, 100, 50, and 10

The normalized $PW_i$ probabilities are represented as fractions defined with numerators equal to pulse counts and denominators equal to the total of all pulses. These dominant fractions are:

$$PW2=50/210, PW4=100/210, PW8=50/210, PW10=10/210$$

These are the percent fractions defining the integer mapping estimates used to define each of the primary 4 decimal value zones of the decimal numbers created by the off-the-shelf random number generator. The pulse width numbers of the remaining 6 pulse widths are set at minor probabilities to maintain a good autocorrelation performance. The output of the random integer mapper will create integer counts consistent with these probabilities, including a count of 1 pulse for each of the 6 minor pulse widths. When combined with the $N_i$ for each pulse count, $PW_i$, will create the 10 power contributions for each $f$ offset that sum to the target power spectral density profile defined by the expression:

$$P_f = \text{SUM}_i[\{(P_{ni}*N_i)/\text{SUM}_i(P_{ni}*N_i)\}*\{SIN(\pi*f*T_i)/(\pi*f*T_i)\}^2]$$

For all power spectral density targets except the pseudorandom noise profile, the random integer mapping parameters are slave to the selected power spectral density profile. For the example in FIG. 10A, there is a dominate set of the 4 major mapping terms and a minor set of 6 mapping terms that are consistent with the target power spectral density $C_i$ terms. The autocorrelation parameters of the resulting binary sequence are enhanced by defining the remaining minor six Pni*Ni terms. These are defined as a single pulse for each of the remaining 6 minor pulse widths as follows:

$$Pb=1, P3=1, P5=1, P6=1, P7=1, P9=1$$

When the random integer mapping factors are configured, and generating random integers, the resulting power spectral density is shown in FIG. 10A and the autocorrelation profile for a 200 chip autocorrelation period is shown in FIG. 10B. This autocorrelation profile with a single peak value of 200 at a selected time phase in the epoch only occurs once each epoch, and only once in a line-of-sight range uncertainty to 2 milliseconds containing 20,000 chips with a chipping rate of 10 MHz. The autocorrelation process uses a continuously changing 200 chip set locally maintained to continuously de-spread the received spread spectrum signals with the code sequence at a specific range delay in chips.

The chipping clock controlled time-shifting memory in the line-of-site communications embodiment covers 300 nautical miles in range uncertainty. There are 20,000 chip memory slots in the lead clock shifted memory and 20,000 chip memory slots in the delay clock shifted memory available for use that provide multiple local code chipping sources with all possible phases in both lead times and delay times with one chip accuracy. The universal GPS time reference phase is found at the boundary chipping slot between the lead and the delayed shifting memory blocks. Reference chip accuracy is within 100 nanoseconds, and a plethora of external phase lock loops and S-curve chipping code tracking methods are possible within state-of-the-art signal processing technologies supported by this invention.

A plethora of code orders and dominant pulse width configurations within each order is possible. For example, an order 20 code configuration could apply the above-described techniques to establish a set of dominant unique pulse widths corresponding to the first eight prime numbers:

2, 3, 5, 7, 11, 13, 17, and 19 chip pulse widths

This creates non-coincident power spectrum nulls except at the common chip rate null at 10 MHz. The 2-chip lowest pulse width results in a two-sided 10 MHz power spectrum with minor nulls at the 5 MHz points without significant side lobes. By filling in the missing pulse width probabilities, autocorrelation and cross correlation parameters are configurable to good-better-best options through a wide range of decimal-to-integer mapping configurations.

Multiple orthogonal random non-cyclical binary codes can be concurrently produced by each random number generator. Each set of three functions (random integer mapping, pre-stored present and future epoch of extended random integers, and the chipping clock shifted memory) together define a unique orthogonal non-cyclical binary code. This is possible because each epoch memory of extended random integers can be filled in less than 10 seconds. A single random number generator has a fill-time budget for all possible orthogonal codes of 10 minutes, allowing many unique epochs of memory to be filled between 10 minute rollover points. Replication of the three functions with one random number generator will be a common configuration for most generator applications involving high numbers of code division multiplexing.

BRIEF DESCRIPTION OF THE DRAWINGS

FIG. 1 shows the random non-cyclical binary code generator used to create the time-synchronized random non-cyclical binary codes for digital signal processing.

FIG. 2 shows the extended random integer epoch fill processes.

FIG. 3 shows the chipping clock shifted memory control processes.

FIG. 4 shows the random non-cyclical binary code generator randomize seed control process.

FIG. 5 shows the random integer sequence length extender for creating the epoch of extended random integers for the present and future epoch memory storage.

FIG. 6 shows the epoch rollover control process and timing.

FIG. 7A shows a specific random non-cyclical binary code generator integer mapper configuration applicable to a pseudorandom noise code configuration for an order 10 code.

FIG. 7B shows the autocorrelation example associated with the selection of a pseudorandom noise pulse width distribution mapping configuration of the random non-cyclical binary code generator.

FIG. 7C shows the power spectral density associated with the pseudorandom noise code configuration of the random non-cyclical binary code generator with a 10 MHz chip rate.

FIG. 8A shows a specific random non-cyclical binary code generator integer mapper configuration for a Gaussian quarter bandwidth for an order 10 code.

FIG. 8B shows the autocorrelation example with the selection of a Gaussian quarter bandwidth pulse width distribution mapping configuration for the random non-cyclical binary code generator.

FIG. 8C shows the power spectral density associated with the Gaussian quarter bandwidth configuration of the random non-cyclical binary code generator with a 10 MHz chip rate.

FIG. 9A shows a S-curve tracking profile with the pseudorandom noise configuration of the random non-cyclical binary code generator with 2-chip off-set using a 10 MHz chip rate with a 5,000-chip correlation period.

FIG. 9B shows a S-curve tracking profile with a Gaussian quarter bandwidth configuration of the random non-cyclical binary code generator with 5-chip off-set using a 10 MHz chip rate and a 5,000-chip correlation period.

FIG. 10A shows an extreme spectrum tailoring configuration of the random non-cyclical binary code generator resulting from the integer mapping configuration, allowing dominate pulse widths of 2 chips, 4 chips, 8 chips, and 10 chips with a 10 MHz chipping rate and order 10 code.

FIG. 10B shows the autocorrelation performance with a 200 chip autocorrelation period based on the extreme spectrum tailoring configuration with dominate pulse widths of 2 chips, 4 chips, 8 chips, and 10 with a 10 MHz chipping rate.

FIG. 11 shows an example of configuration parameters for a pseudorandom noise code configuration of the random non-cyclical binary code generator.

FIG. 12 shows an example of configuration parameters for a Gaussian quarter bandwidth configuration of the random non-cyclical binary code generator.

DETAILED DESCRIPTION OF THE INVENTION

In the detail in FIG. 1, I describe the random non-cyclical binary code generator elements. A proven off-the-shelf GPS receiver 1 provides the chipping clock pulses 2 and the event reference pulses 3 that form the time synchronization reference for the random non-cyclical binary code generator. The epoch fill controller 4 initiates all random number requests 8 in response to the epoch status 7 and epoch set request 5. Initialization control of the random non-cyclical binary code generator is provided by the epoch integer selection controller 20 consistent with the event reference 3 and the chipping clock pulses 2. Code startup consists of a fast forward of the selected epoch until code phase in chips at the center of the clock shifted memory is synchronized with GPS universal time in the event reference 3. At this point, the gated clock pulse 21 source is turned on, providing chipping clock pulses to the clock-shifting memory 28. Each new epoch at epoch rollover is initiated with the epoch set request 5 occurring after actual rollover time of day in the event reference 3 or during cold start of the signal processing activity in the epoch integer selection controller 20. Before every new epoch, a seed request 16 is sent from the epoch integer selection controller 20. The randomize seed 6 is created by the seed selection algorithm 15 and sent to the state-of-the-art random decimal number generator 9 as part of the random number request 8. The immediate output is the random decimal number 10 sent to the decimal-to-integer mapper 11. An immediate conversion from random decimal number 10 to a random integer 12 is completed for an order 10 random non-cyclical binary code in this embodiment. The integer sequence extender 13 contains all of the elements to expand the sequence length of the received integers into an extended random integer 14 to fill the present and future epoch memory 17 associated with a chipping sequence length of 6 billion chips per 10-minute epoch. The epoch integer selection controller 20 sends an extended random integer request 18 and immediately receives the next extended random integer 19 from the present epoch memory 17. The present extended random integer 22 is sent by the epoch integer selection controller 20 to the integer controller 23 with timing information. The integer controller sends the integer 24 consistent with timing data to the integer-to-chip pulse converter 26 where a chip pulse pair 27 is formed and concatenated to the loading end of the chipping clock shifted memory 28. The precise concatenation time is controlled by the memory status 25 that indicates when shifting activity is idle. Each chip memory slot in the clock shifted memory 28 generates a phase-unique random non-cyclical binary code 29 relative to the center chip memory slot that is maintained at GPS universal time code time of day.

In FIG. 2, I describe the random non-cyclical binary code generator epoch fill processes and associated elements, including the decimal-to-integer mapper 11 that converts each random decimal number 10 into a random integer 12 that is the input to the integer sequence extender 13. The random decimal number 10 is compared with the configured value zones 30 in the decimal-to-integer converter 11. A zone corresponding to one of ten integer output values 31 triggers the applicable integer to the output 12 referred to as the random integer. Prefill of the present and future random non-cyclical binary code integer's epoch memory 17 is completed on a burst basis, receiving the extended random integers 14 from the integer sequence extender 13. The burst fill process is controlled by the integer sequence extender 13 that completes each epoch fill to exactly an integer count corresponding to a projected 6 billion chips. The last integer is adjusted in value to force this epoch chip count. The burst asynchronous flow of extended random integers is initiated by the epoch integer selection controller 20 using the GPS event reference 3 and universal time reference 2. This timing triggers the epoch set request 5 that initiates the next epoch refill.

The flow of synchronized extended random integers is controlled by random integer request 18 from the epoch selection controller 20. The next extended random integer 19 is received immediately by the epoch integer selection controller and passed to the integer controller 23 as a precise timed extended random integer 22. A further refined timed extended random integer 24 is passed to the integer-to-chip-pulse converter 26. Pulse pairs are then created at output 27 for concatenation to the clock shifted memory.

In FIG. 3, I describe the random non-cyclical binary code generator chipping clock shifted memory 28. The process is driven by the epoch integer selection controller 20 and the memory status 25 passed from the memory load zone 35. Upon receipt of the load zone ready for next integer memory status 25, the extended random integer request 18 is sent from the epoch integer selection controller 20. The next integer 19 is received immediately and passed to the integer controller 23 as the next extended random integer 22 that includes timing information. This timing information ensures that the chip pulse pair 27 from the integer-to-chip pulse converter 26 is concatenated to the load zone 35 within the 100 nanoseconds window of non-shifting activity for a 10 MHz chipping rate. When in this window, the converted chip pulse pair is concatenated to the load zone 35 of the clock shifted memory 28. The next shift action moves the concatenated pulse pair along left with the remaining code chips. Delay memory 33 contains all code phases later than the GPS universal time of day and up to the maximum range of the code environment in chips. The lead chipping memory 34 contains all possible code lead phases that are usable for transmissions designed to be received with zero-range uncertainty at the connecting receiver node. This output phase is represented by the random non-cyclical binary code chipping stream 29 that represents the selected phase options for transmit or receive local code phases. The clock shifting memory phase status is represented by the shift memory status 32 data received by the shift memory controller 36. Precision timing of the memory shift is provided by input event reverence 3 and chipping clock 2 received by the shift memory controller 36. The shift control is consistent with the gated clock pulses 21 from shift memory controller 36 to the clock shifted memory 28.

In FIG. 4, I describe the randomize seed selection and format applicable to each epoch of random non-cyclical binary code based on a 10-minute epoch. In this embodiment, the randomize seed configuration data 37 is provided by the seed selection algorithm 15 in response to a seed request 16. The format of each seed is a decimal integer nine-figure set 38 with a five-digit incrementing set 41 for this embodiment of a 10 MHz chipping rate code and 10-minute epoch. This incrementing 5-digit set configures a year's worth of 10 minute orthogonal codes. The 3-digit portion 40 is for configuration of 999 unique local codes for orthogonal channels at any time. A first digit value 39 is 1 or 2, and is fixed for the year and toggled between the two integers every year. The seed selection algorithm creates this format to configure the random number generator for a new orthogonal 10-minute epoch.

In FIG. 5, I describe the detail of the random non-cyclical binary code generator integer sequence extender 13 for an order 10 random non-cyclical binary code. The decimal-to-integer mapper 11 provides random integers 12 to the column-row selection algorithm 45 as a base input integer set. The set is divided into 10 columns of integer subsets 46 forming a block of 10 columns of integers 48 for an order 10 random non-cyclical binary code. The extended random integer 19 is retrieved from the block of 10 columns of integers 48 by selecting an address value 47 based on the current column address selection 43. The result is a block row actual address value 44 defined by the address matrix 42. This defines the next extended random integer row position 47 to retrieve the next extended random integer 19. This integer is added asynchronously in a burst at speeds at the limit of the random number generator to the epoch extended integer present and future memory 17. The address matrix 42 is a 10-by-10 matrix for an order 10 random non-cyclical binary code. Both present and future epoch memories are prefilled before the time-synchronized generation of the random non-cyclical binary code begins. The asynchronous block reading continues, and is repeated using all 10 rows of the address matrix 42. After the last row of the address matrix is used to read the block of columns 48, a shuffled version of the block 48 is selected as a new block and the process is repeated. After 10 shuffled blocks are processed, an additional column of random integers 14 is requested from the random number generator and received from the decimal-to-integer mapper 11. This defines a new block of 10 columns of integers 48, excluding the oldest column of integers. The block reading and shuffling processes are repeated until the last integer in the epoch of extended random integers 19 is received that matches or exceeds the chipping count of 6 billion chips for the epoch. This last integer is modified to an integer exactly matching the chipping count of 6 billion chips.

In FIG. 6, I describe a 1 millisecond segment 49 and a following 1 millisecond segment 52 phase chip output of the left-shifting memory array within the present epoch only. The millisecond boundary 51 falls precisely on a chip boundary, but not on a pulse boundary 50. This is true of all millisecond pairs 54 in a present epoch 53. The millisecond at the end of the present epoch 55 contains the last chipping pulse pair 56 of the epoch. This last pulse pair 56 before the beginning of the first millisecond 57 of the future epoch is forced to precisely end at the end of the epoch, replacing the last extended random integer as necessary to complete the epoch. Rollover to the future epoch begins a new pulse pair from the future epoch memory orthogonal code. Future epoch designation is changed to the present epoch and a new future epoch is prefilled asynchronously on a burst basis.

FIG. 7A shows the random non-cyclical binary code mapping configuration for emulating the pseudorandom noise code pulse width statistical distribution. The actual code integer mapper zones are defined by 10 fractions of probabilities of pulse widths 58 that form the mapping configuration for an order 10 code. The count of pulse pairs times the chips per pulse width 59 forms the allocation of chips to each of the unique pulse width possibilities. A unity normalized values 60 of these chipping allocations is plotted with the y-axis 61 representing the normalized fraction values 62 for each of the x-axis chip pulse widths 63.

FIG. 7B shows the resulting autocorrelation peaks characteristics of pseudorandom noise code emulation by the random non-cyclical binary code generator mapping configuration. The example autocorrelation peak 64 is given for a 5,000-chip autocorrelation period across 20,000 chips of autocorrelation values. A close-up of the autocorrelation peak 66 within a 200-chip zone displays a 5,000-to-500 ratio of peak to off-correlation peaks ratio across the y-axis autocorrelation values 65 across 200 chips in chip phase locations 67.

FIG. 7C shows the power spectral density of a pseudorandom noise emulation configuration of the random non-cyclical binary code. This specific order 10 random non-cyclical binary code power spectral density is plotted with the main lobe peak 69 normalized to a 0 dB value. The y scale 68 of the power spectral density plot is in dB relative to the peak power point. There are two side lobes shown in the scope of this plot with the first null point 70 at 10 MHz from center frequency consistent with the 10 MHz chipping rate of the code. The second null 71 is at 20 MHz, and the third null 72 is at 30 MHz. The y-axis in this power spectrum plot is in dB log scale representing 10×log base 10 (linear power value). This spectrum is unique to the pseudorandom noise emulation configuration of the random non-cyclical binary code generator.

FIG. 8A shows the random non-cyclical binary code generator integer mapping 73 configuration for a Gaussian quarter bandwidth configuration for order 10 codes. In the forced Gaussian spectrum configuration, the time profile of the chipping allocations for each pulse is represented by the product of the pulse probability and the chips per that pulse width. This product is labeled Pn*Ni over the chips count per pulse width column 74. Normalization fractions are given in the column labeled Ci/Sum(Ci) 75 where the sum of the fractions is always equal to 1. The peak 77 of the chipping count probabilities represents the fractional chipping allocations dedicated to each pulse width of the 10 unique widths in this embodiment. The y-axis scale 76 is in linear scale in terms of this chipping count probability. Unlike the pseudorandom noise configuration where the code pulse widths drive the spectrum, this and all other cases, including the Gaussian case, determine the configuration from a target power spectrum profile 77. The pulse width probabilities 73 are derived from the target power spectrum corresponding with the chipping distribution 77. The Pn in the product Pn*Ni must be extracted by dividing the product values 74 by the known Ni values of 1, 2, 3, 4,—etc. The result is the column of mapping fractions 73 as shown that, when applied to a chipping distribution, will result in the chipping allocations in the chipping column 75.

FIG. 8B shows the resulting autocorrelation peaks characteristics of a Gaussian quarter bandwidth configured random non-cyclical binary code with a 5,000-chip correlation length. The example autocorrelation peak 79 represents the autocorrelation value for a single in-phase point in chip phase values. All other autocorrelation values in the y-axis 80 are confined to an autocorrelation peak statistically below 500 for the out-of-phase autocorrelations. A zoom of the peak detail shows a main peak 81 plus sub-peaks out to 200 chips in phase. Multiple correlation side lobes are common to 200 chip count autocorrelation in random non-cyclical binary codes.

FIG. 8C shows the power spectral density profile for the Gaussian quarter bandwidth configuration of the random non-cyclical binary code. This specific order 10 Gaussian distribution produces a narrow main lobe with a peak 83 with a rapid decline of power spectrum values out to the first null point 84 located at 10 MHz consistent with the chipping rate of 10 MHz. The y-axis 82 is the power spectral density that is scaled in dB or 10×log base 10 (linear power density). The second chipping rate null 85 is at the 20 MHz point and the third chipping null 86 is at the 30 MHz point harmonics of the base chipping rate of 10 MHz. This profile is near Gaussian to about −15 dB and represents a main lobe bandwidth of one-quarter of the 20 MHz chipping rate or 5 MHz, two-sided bandwidth.

In FIG. 9A, I describe the autocorrelation S-curve tracking profile linear scale values 87 that represent the emulated pseudorandom noise code difference of two autocorrelation curves that have a 2-chip difference in phase. In this figure, the difference curve results in a positive peak 88 followed by a negative peak 89 with a high slope linear plot between them. This linear zone is a phase tracking reference zone used as feedback to correct a receiver time of day delay error toward the zero phase error point at the axis crossing. This zero point is where the linear line beginning at peak 88 and ending at peak 89 crosses the x-axis. This plot was made of the S-curve phase position win a 200 chip zone of the x-axis 90 using a 5,000-chip autocorrelation period.

In FIG. 9B, I describe the S-curve autocorrelation tracking detail of the embodiment of long correlation lengths of 5,000 chips for the Gaussian quarter bandwidth configuration of the random non-cyclical binary code. The y-axis 91 represents a correlation value for each phase shift in chips across 150 chips across the x-axis. Shown here is the close view of the 5,000 chip Gaussian quarter bandwidth random non-cyclical binary code S-curve autocorrelation tracking profile. The S-curve was created with a 5 chip offset resulting in a positive peak 92 and autocorrelation negative offset peak 93. The peaks are separated by 5 chips in phase and reflect an actual peak value of over 8,000 for a 5,000-chip autocorrelation zone with positive contributions from the inverse peaks in the autocorrelation side lobes. In this case, the center linear slope from peak 92 and peak 93 represents the tracking zone over 5 chips of the S-curve where the zero phase error feedback point is located at the x-axis crossover point.

In FIG. 10A, I describe an example of extreme power spectrum tailoring with extended random integer mapping to only four primary dominating integers 2, 4, 8, and 10 defining the major chip pulse widths of an order 10 code. All other pulses are forced to a fractional value of 1/total pulse width. This results in dominate pulse widths of 2 chips, 4 chips, 8 chips, and 10 chips. The y-axis scale numbers 94 are in dB in the form of 10*log base 10 (linear power spectrum values). The peak power spectral density 95 is normalized to 0 dB and extends to the first side lobe at −20 dB below the peak near the first minor null 97 at 5 MHz. The next two nulls include the first major null 98 at 10 MHz and next minor null 99 at 15 MHz dictated by the narrowest chip pulse width of 2 chips and a chipping rate of 10 MHz in this embodiment. The main lobe 2-sided bandwidth at the −15 dB point 96 is 5 MHz that is uncommon for a 10 MHz chipping rate code. This kind of tailoring of pulse width probabilities through the integer mapper allows complete spectrum bandwidth control with a fixed 10 MHz chipping rate.

In FIG. 10B, I describe the autocorrelation function plot for the 5 MHz 2-sided bandwidth configuration with primary pulse width integers 2, 4, 8, and 10. The y-axis 100 is in a linear scale of the autocorrelation peak values. The autocorrelation plot extends across 200 chips in phase 103 with the autocorrelation zone of 200 chips. The peak value 101 at the in-phase point is equal to 200. The second autocorrelation peak 102, which is negative, is shown in a cluster of minor peaks about the major peak. This is a better performance short random non-cyclical binary code autocorrelation profile. Like all random non-cyclical binary codes, this orthogonal code has only one major peak 101 across the entire 10-minute epoch of 6 billion chips for an order 10 code configuration.

In FIG. 11 I list the specific numeric parameters of the presented embodiment of the pseudorandom noise random non-cyclical binary code. The primary driver of the random number start point is the seed 104 used in the random number generator. The resulting random numbers across first few rows of ten 100-integer columns is shown in the group 105 resulting from the random integer mapping factors 106. Actual integer normalized mapping value widths 106 are divided by the sum, 10,230, for the fraction value zone for each mapped integer. Random integer sequences are converted to an extended random integer sequence using a 10-by-10 address matrix 107 for this embodiment. This embodiment results in the first 200 extended random integers 108 to be converted to pulse-pair chipping streams. The random non-cyclical binary code generator chipping stream 109 results in a pulse-pair width probability distribution close to a pseudo-random noise shift register binary code distribution. The sums of ones (1s) minus sums of zeros (0s) in the random non-cyclical binary codes are continually equal to zero, independent of the source number of extended random integers.

In FIG. 12, I list the specific numeric parameters of the presented embodiment of the Gaussian quarter bandwidth random non-cyclical binary code. The primary driver of the random number start point is the randomize seed 110 used in the random number generator. The resulting random numbers across the first few rows of ten 100-integer columns is shown in the group 111 resulting from the random integer mapping factors 112. Actual mapping value widths are these factors divided by the sum, 23,547, for the normalized fraction value for each mapping zone. Random integer sequences are converted to the extended random integer sequence using a 10-by-10 address matrix 113 used in this embodiment. All matrix rows 113 are applied to each complete random integer block and repeated with each new defined block of random integers. This configuration results in the first 200 extended random integers 114 to be converted to pulse-pair chipping streams. The random non-cyclical binary code chipping stream 115 is the result.

What is claimed is:

1. A random non-cyclical binary code generator comprising:
 a GPS receiver for providing a universal time clock reference used to control events associated with a time-synchronous reading of sub-codes from a pre-defined frame memory within an epoch of sub-codes usable by a signal processing system;
 a random decimal number generator to create a sequence of random decimal numbers with values of 0.0 to 1.0 inclusive or exclusive of the endpoints upon request;
 a decimal-to-integer mapper to create a set of random integers with a tailored statistical distribution derived from said sequence of random decimal numbers created by said random number generator;
 a random integer sequence extender wherein said set of random integers is expanded to longer sequences, which form extended random integers, while maintaining said tailored statistical distribution of said set of random integers;
 a randomize seed selection algorithm for said random decimal number generator that enables a unique sequence of random decimal numbers to be output from said random decimal number generator and used by said decimal-to-integer mapper to convert random decimal numbers to random integers for use by said random integer sequence extender, wherein said random integer sequence extender is the source of all extended random integers contained in a pre-defined epoch memory of extended random integers;
 a present and future epoch memory containing said extended random integers, wherein the smallest epoch unit containing extended random integers is a 1-second epoch of extended random integers, wherein the sum of all integer values in said 1-second epoch of extended random integers is 10 million, and wherein there are an even number of extended random integers, wherein each odd index integer represents a logical all ones (1s) binary pulse with bit count equal to an extended random integer value and each even index integer represents a logical all zeros (0s) binary pulse of bit count equal to an extended random integer value, and wherein there are 5 million logical binary ones (1s) and 5 million logical binary zeros (0s) defined by said 1-second epoch of extended random integers;
 an epoch integer selection controller that copies integers from said 1-second epoch memory of extended random integers to a separate 1-second epoch memory of extended random integers;

an integer-to-chip-pulse converter that reads said separate 1-second epoch memory of extended random integers, wherein all integers are indexed from 1 in ascending order, and wherein all odd indexed integers are converted to a binary all ones (1s) pulse, and all even indexed integers are converted to a binary all zeros (0s) pulse, where the pulse widths in bit counts are equal to the values of the extended random integers and concatenated together to form a 1-second epoch of random non-cyclical binary code, and wherein said 1-second epoch of random non-cyclical binary code is parsed into 8 bit parses, wherein each said parse is a code byte represented by two HEX characters, and each 1-second epoch of code bytes is parsed into an integer number of frames, wherein a frame of code bytes contains 5000 code bytes representing 100 orthogonal random non-cyclical binary sub-codes, wherein each said sub-code is defined by 50 code bytes;

a clock-shifted memory of said code bytes that is equivalent to said frame of code bytes corresponding to a specific 4-millisecond time of day time period in code bytes in a 1-second epoch of code bytes, wherein said 100 orthogonal random non-cyclical binary sub-codes are bulk loaded in sets of 10 sub-codes in the form of 500 code bytes at a time into a load zone of code bytes in said clock-shifted memory, wherein all sets of 10 sub-codes in said clock-shifted memory are left-shifted in parallel across the clock-shifted memory, wherein the load and shift events are repeated until said clock-shifted memory is filled, after which a time-of-day synchronous 10 MHz chipping clock transfers one or more orthogonal sub-codes from said frame chip by chip out to selected modulators or demodulators during each 40 microsecond code correlation time slot, wherein 100 orthogonal sub-codes are available to 100 modulators or demodulators, wherein sub-codes clocked to each modulator are unique relative to sub-codes clocked to all other active modulators, wherein no modulator or demodulator receives a repeated sub-code during the frame of 100 40 microsecond code correlation time slots in each said 4-millisecond time of day time period, and wherein each said 4-millisecond time of day time period is usable by said signal processing system; and an epoch fill controller for preloading epochs of said extended random integers providing one-time fills of pre-defined memory containing said 1-second epochs of extended random integers, wherein a sequence of random number requests are initiated to said random decimal number generator followed by a delivery of a corresponding sequence of random decimal numbers to said decimal-to-integer mapper, followed by a delivery of a sequence of mapped random integers to said random integer sequence extender, wherein said set of random integers is formed into column-row blocks of random integers according to a column-row selection algorithm, wherein said extended random integers are saved in a memory of said blocks of random integers by said random integer sequence extender, wherein said extended random integers are requested and processed by said epoch fill controller to fill a 0.5 second epoch memory of extended random integers, wherein the last appended extended random integer causes the sum of integer values to be 5000 or greater, and wherein selected random integers in said 0.5 second epoch memory are reduced in value by 1 until said sum of integer values is exactly 5000, which forms an adjusted integer set, and wherein said adjusted integer set is copied in reverse index order to form a reverse integer set, and wherein said adjusted integer set and said reverse integer set are shuffle merged and saved to a memory of said 1-second epoch of extended random integers.

2. The random integer sequence extender of claim 1, wherein the random integer sequence extender further comprises:

a block of random integers wherein the number of columns in said block is equal to the maximum number of equal binary bits defining a pulse of said random non-cyclical binary code bits, which is a code order, and wherein a common number of integers in the number of columns is configurable;

a column-row selection algorithm that configures and defines an address matrix read algorithm that points to a next column-row location in said block of random integers, wherein the next integer read location in said block of random integers is provided by an address matrix that returns a row address integer value, wherein said row address integer value is used to select a next row position in said block of random integers, and wherein the random integer value at said next row position in said block of random integers is read and appended to said 1-second epoch memory of said extended random integers, and wherein each row of the address matrix block of integer values is the pointer reference for one cycle of all rows in said block of random integers, wherein after all rows of said address matrix block of random integers have been used as pointer references, a new block of random integers is defined, and said address matrix read algorithm is repeated until all integers required by said epoch fill controller are requested;

an integer column add-on of said block of random integers used by said random integer sequence extender for defining a new block of random integers by deleting the oldest column and integrating said add-on column of said random integers into the remaining columns of said new block of random integers; and an address matrix containing a number of columns equal to said number of columns in said block of random integers and multiple rows of unique integer values sequences with values from 1 up to said code order used for pointing to said position in a row of said block random integers.

3. The random non-cyclical binary code generator of claim 1, wherein the clock-shifted memory of said code bytes further comprises:

a clock-shifted delay memory portion of said clock-shifted memory of code bytes extended over a delay time uncertainty of 2 milliseconds, which is equal to a maximum communication range with event tracking error of 10 nanoseconds or less that is supported by said signal processing system;

a clock-shifted lead memory portion of said clock-shifted memory of code bytes extended over a lead time uncertainty of 2 milliseconds, which is equal to a maximum communications range with event tracking error of 10 nanoseconds or less that is supported by said signal processing system;

a clock-shifted memory controller that, on startup, sets a future frame start point in said 1-second epoch of code bytes, wherein a bulk load of said frame of code bytes defines a future clock-shifted memory in said 1-second epoch of code bytes, wherein said frame of code bytes is frozen until time of day catches up with said start point of said frame, wherein a time match at a code byte level initiates all frame event clocks, wherein the time-of-day synchronous 10 MHz chipping clock is gated on at the beginning of each said 40 microsecond correlation time slot in said frame of code bytes to control one or more sub-code chip by chip transfers to modulators and demodulators of said signal processing system; and a clock-shifted memory load zone for receiving said sets of 500 code bytes for bulk loading into said load zone, wherein said load zone of code bytes flows as fast as possible into said 4-millisecond frame, wherein clock shifts move sets of 10 sub-codes to pre-load the selected frame, wherein steady state synchronous 10 MHz chipping clocks proceed to control one or more sub-code chip by chip flows during each 40 microsecond correlation time slot, wherein said 100 orthogonal sub-codes are available to 100 modulators or demodulators of said signal processing system.

* * * * *